(12) United States Patent
Kacevas et al.

(10) Patent No.: US 10,249,017 B2
(45) Date of Patent: Apr. 2, 2019

(54) APPARATUS AND METHOD FOR SHARED RESOURCE PARTITIONING THROUGH CREDIT MANAGEMENT

(71) Applicant: Intel Corporation, Santa Clara, CA (US)

(72) Inventors: Nicolas Kacevas, Folsom, CA (US); Niranjan L. Cooray, Folsom, CA (US); Madhura Joshi, San Jose, CA (US); Satyanarayana Nekkalapu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 15/234,773

(22) Filed: Aug. 11, 2016

(65) Prior Publication Data

US 2018/0047131 A1    Feb. 15, 2018

(51) Int. Cl.

| | |
|---|---|
| *G06F 9/46* | (2006.01) |
| *G06T 1/60* | (2006.01) |
| *G06F 12/1027* | (2016.01) |
| *G09G 5/36* | (2006.01) |
| *G06T 15/00* | (2011.01) |
| *G09G 3/00* | (2006.01) |

(52) U.S. Cl.
CPC ............ *G06T 1/60* (2013.01); *G06F 12/1027* (2013.01); *G06T 15/005* (2013.01); *G09G 5/363* (2013.01); *G09G 3/003* (2013.01); *G09G 2360/08* (2013.01); *G09G 2360/121* (2013.01)

(58) Field of Classification Search
CPC ..... G06F 1/60; G06F 12/1027; G06T 15/005; G09G 5/363; G09G 3/003; G09G 2360/08; G09G 2360/121
See application file for complete search history.

(56) References Cited

U.S. PATENT DOCUMENTS 3,819,865 A * 6/1974 Weber .................... H04Q 3/545
370/381
5,590,381 A * 12/1996 Mourad ............... G11B 27/002
345/539

(Continued)

OTHER PUBLICATIONS

International search Report and Written Opinion for International Patent Application No. PCT/US2017/040927, dated Oct. 18, 2017.

*Primary Examiner* — Camquy Truong
(74) *Attorney, Agent, or Firm* — Green, Howard & Mughal LLP

(57) ABSTRACT

An apparatus is provided which comprises: a first engine buffer to receive a first engine request; a first engine register coupled to the first engine buffer, wherein the first engine register is to store first engine credits associated with the first engine buffer; a second engine buffer to receive a second engine request; a second engine register coupled to the second engine buffer, wherein the second engine register is to store second engine credits associated with the second engine buffer; and a common buffer which is common to the first and second engines, wherein the first engine credits represents one or more slots in the common buffer for servicing the first engine request for access to a common resource, and wherein the second engine credits represents one or more slots in the common buffer for servicing the second engine request for access to the common resource.

20 Claims, 18 Drawing Sheets

(56) References Cited

U.S. PATENT DOCUMENTS

| | | | |
|---|---|---|---|
| 7,620,693 B1* | 11/2009 | Mott | H04L 47/621 |
| | | | 709/213 |
| 8,799,914 B1* | 8/2014 | Metcalf | G06F 9/5022 |
| | | | 718/104 |
| 2004/0215858 A1 | 10/2004 | Armstrong et al. | |
| 2007/0094664 A1 | 4/2007 | So et al. | |
| 2007/0204137 A1 | 8/2007 | Tran | |
| 2009/0217269 A1* | 8/2009 | Heller | G06F 9/52 |
| | | | 718/100 |
| 2010/0146209 A1 | 6/2010 | Burger et al. | |
| 2011/0075555 A1* | 3/2011 | Ziegler | H04L 49/505 |
| | | | 370/229 |
| 2011/0093471 A1* | 4/2011 | Brockway | G06F 17/30616 |
| | | | 707/747 |
| 2013/0212585 A1 | 8/2013 | Tran | |
| 2013/0290578 A1* | 10/2013 | Chrysos | H04L 47/39 |
| | | | 710/105 |
| 2017/0366616 A1* | 12/2017 | Rodrigues Nascimento | H04L 67/34 |

\* cited by examiner

APPARATUS AND METHOD FOR SHARED RESOURCE PARTITIONING THROUGH CREDIT MANAGEMENT

BACKGROUND

A graphic chip supports several graphic engines. These engines can use independent memory spaces, but use a common resources in certain logics (e.g., the translation lookaside buffer (TLB) logic and memory request logic). These common resources could become blocked in the case of page faults from a specific engine, but because they are common, it is possible that the faulty engine would overtake the totality of the resources, and block entirely all the engines pipelines, and not just the faulty one. It is generally required of the computing system for the engines to be able to make progress independently. Furthermore, it is possible that by clogging the whole fabric (e.g., interconnect and buses) associated with the common resources, deadlock scenarios could occur.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
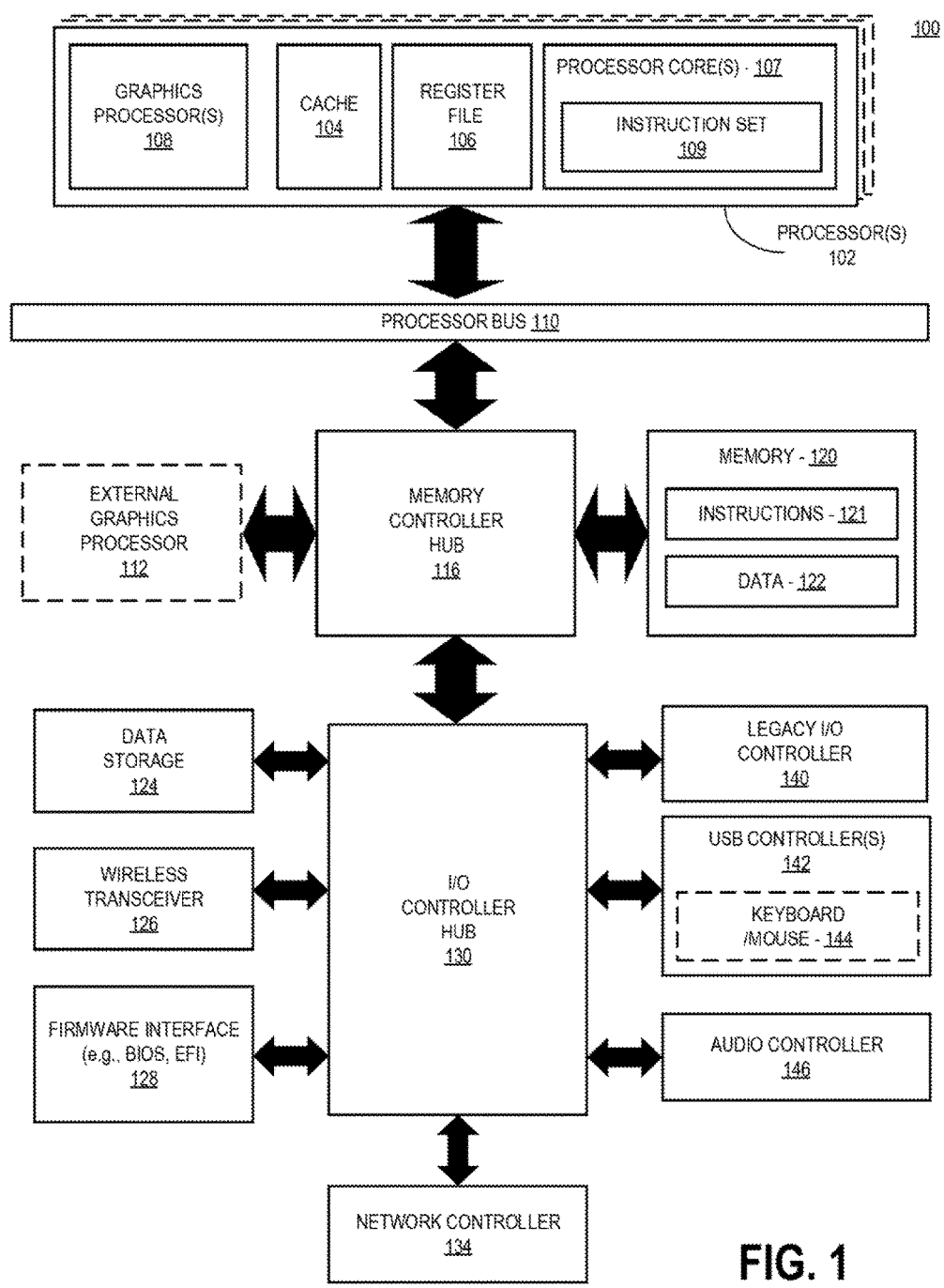
FIG. 1 illustrates a block diagram of a data processing system with apparatus for shared resource partitioning through credit management, according to some embodiments of the disclosure.

One way to address the clogging of the whole fabric associated with the common resources and deadlock scenarios is to include creating large guard bands before clock cycles are committed to the common fabric. However, these guard bands are to be sized to accommodate the worst case scenarios, which is challenging to determine. Here, the term "common resource" generally refers to resources (e.g., system memory, shared cache, etc.) which two or more engines or logics (e.g., rendering engine, filtering engine, video post processing, translation lookaside buffer, etc.) share.

Some embodiments describe apparatuses and methods for partitioning a total number of available slots of a common resource between the engines, so each engine will receive a number of credits to be used. In some embodiments, the credits are consumed each time a cycle (e.g., a clock cycle or a processing cycle) gets committed to the common resource. In some embodiments, once the cycle is completed, the credit is returned to that engine's pool of credits. In some embodiments, a cycle is not committed to an engine if there are no credits available for that engine.

In some embodiments, the partitioning of the credits can be Static or Dynamic. In some embodiments, the static credits are programmable through configuration registers. In some embodiments, for the case of partitioning the credits statically, a fixed number of credits is assigned to every engine, and these credits stay assigned, regardless if the credits are actually used or not by the engines. In some embodiments, the sum of the assigned credits is equal to the total available slots of the relevant common resource.

In some embodiments, for the case of partitioning the credits dynamically, an initial number of credits is assigned to each engine, but an additional group of credits is assigned to a common pool. As the computing system starts operating, it is possible that a particular engine is being used more intensely than others. In some embodiments, when an engine consumes its credits (or its level reaches a predetermined threshold), credits from the common pool are transferred to that engine. In some embodiments, if an engine is not using its credits, the engine releases its credits to the common pool. In some embodiments, a programmable minimum number of credits are made available for the engine when it releases its credits. Partitioning the credits dynamically provides a much better utilization of the available common resources when the usage of the common resources is not symmetric between engines, in accordance with some embodiments. Both methods of partitioning the credits (e.g., statically or dynamically) improves dramatically the usage of the available shared resources by reducing the amount of guard band needed for proper functioning.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates a block diagram of a data processing system 100 with apparatus for shared resource partitioning through credit management, according to some embodiments of the disclosure. Data processing system 100 includes one or more processors 102 and one or more graphics processors 108, and may be a single processor desktop system, a multiprocessor workstation system, or a server system having a large number of processors 102 or processor cores 107. In some embodiments, data processing system 100 is a system on a chip integrated circuit (SOC) for use in mobile, handheld, or embedded devices.

An embodiment of data processing system 100 can include, or be incorporated within a server-based gaming platform, a game console, including a game and media console, a mobile gaming console, a handheld game console, or an online game console. In some embodiments, data processing system is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, one or more processors 102 each include one or more processor cores 107 to process instructions which, when executed, perform operations for system and user software. In some embodiments, each of the one or more processor cores 107 is configured to process a specific instruction set 109. The instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109 which may include instructions to facilitate the emulation of other instruction sets. Processor core 107 may also include other processing devices, such a Digital Signal Processor (DSP).

In some embodiments, processor 102 includes cache memory 104. Depending on the architecture, processor 102 can have a single internal cache or multiple levels of internal cache. In some embodiments, the cache memory is shared among various components of processor 102. In some embodiments, processor 102 also uses an external cache (e.g., a Level-3 (L3) cache or Last Level Cache (LLC)) (not shown) which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of processor 102.

In some embodiments, processor 102 is coupled to processor bus 110 to transmit data signals between processor 102 and other components in system 100. System 100 uses an exemplary 'hub' system architecture, including a memory controller hub 116 and an input output (I/O) controller hub 130. Memory controller hub 116 facilitates communication between a memory device and other components of the system 100, while I/O Controller Hub (ICH) 130 provides connections to I/O devices via a local I/O bus.

In some embodiments, memory device 120, can be a Dynamic Random Access Memory (DRAM) device, a Static Random Access Memory (SRAM) device, flash memory device, or some other memory device having suitable performance to serve as process memory. Memory 120 can store data 122 and instructions 121 for use when processor 102 executes a process. Memory controller hub 116 also couples with an optional external graphics processor 112, which may communicate with one or more graphics processors 108 in processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110.

Figure 2:
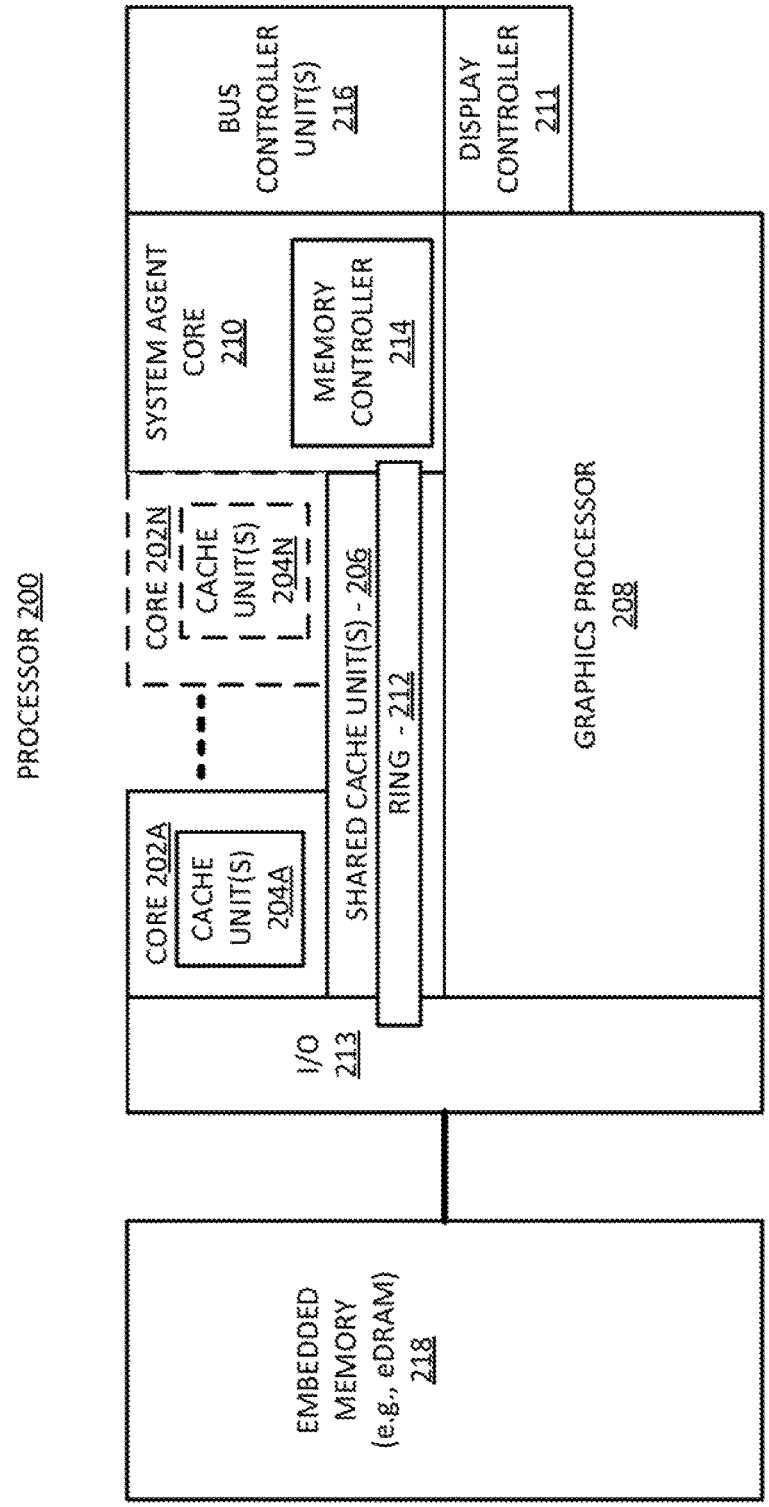
FIG. 2 illustrates a block diagram of a processor having one or more processor cores, an integrated memory controller, and an integrated graphics processor, and with apparatus for shared resource partitioning through credit management, according to some embodiments of the disclosure.

FIG. 2 illustrates a block diagram of an embodiment of processor 200 having one or more processor cores 202A-N, integrated memory controller 214, and integrated graphics processor 208. It is pointed out that those elements of FIG. 2 having the same reference numbers (or names) as the elements of any other figure can operate or function in any manner similar to that described, but are not limited to such.

Processor 200 can include additional cores up to and including additional core 202N represented by the dashed lined boxes. Each of the cores 202A-N include one or more internal cache units 204A-N. In some embodiments, each core also has access to one or more shared cached units 206.

In some embodiments, internal cache units 204A-N and shared cache units 206 represent a cache memory hierarchy within processor 200. The cache memory hierarchy may include at least one level of instruction and data cache within each core and one or more levels of shared mid-level cache, such as a Level-2 (L2), Level-3 (L3), Level-4 (L4), or other levels of cache, where the highest level of cache before external memory is classified as the last level cache (LLC). In some embodiments, cache coherency logic maintains coherency between the various cache units 206 and 204A-N.

In some embodiments, processor 200 may also include a set of one or more bus controller units 216 and system agent 210. The one or more bus controller units manage a set of peripheral buses, such as one or more Peripheral Component Interconnect buses (e.g., PCI, PCI Express). In some embodiments, system agent 210 provides management functionality for the various processor components. In some embodiments, system agent 210 includes one or more integrated memory controllers 214 to manage access to various external memory devices (not shown).

In some embodiments, one or more of the cores 202A-N include support for simultaneous multi-threading. In such embodiments, system agent 210 includes components for coordinating and operating cores 202A-N during multi-threaded processing. In some embodiments, system agent 210 may additionally include a power control unit (PCU), which includes logic and components to regulate the power state of the cores 202A-N and graphics processor 208.

In some embodiments, processor 200 additionally includes a graphics processor 208 to execute graphics processing operations. In some embodiments, graphics processor 208 couples with the set of shared cache units 206, and system agent unit 210, including one or more integrated memory controllers 214. In some embodiments, display controller 211 is coupled with graphics processor 208 to drive graphics processor output to one or more coupled displays. In some embodiments, display controller 211 may be a separate module coupled with the graphics processor via at least one interconnect, or may be integrated within the graphics processor 208 or system agent 210.

In some embodiments, a ring based interconnect unit 212 is used to couple the internal components of processor 200, however an alternative interconnect unit may be used, such as a point to point interconnect, a switched interconnect, or other techniques, including techniques well known in the art. In some embodiments, graphics processor 208 couples with ring interconnect 212 via I/O link 213.

The example I/O link 213 represents at least one of multiple varieties of I/O interconnects, including an on package I/O interconnect which facilitates communication between various processor components and a high-performance embedded memory module 218, such as an eDRAM module. In some embodiments, each of cores 202-N and graphics processor 208 use embedded memory modules 218 as shared last level cache.

In some embodiments, cores 202A-N are homogenous cores executing the same instruction set architecture. In another embodiment, cores 202A-N are heterogeneous in terms of instruction set architecture (ISA), where one or more of cores 202A-N execute a first instruction set, while at least one of the other cores executes a subset of the first instruction set or a different instruction set.

In some embodiments, processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, processor 200 can be implemented on one or more chips or as a system on a chip (SOC) integrated circuit having the illustrated components, in addition to other components.

Figure 3:
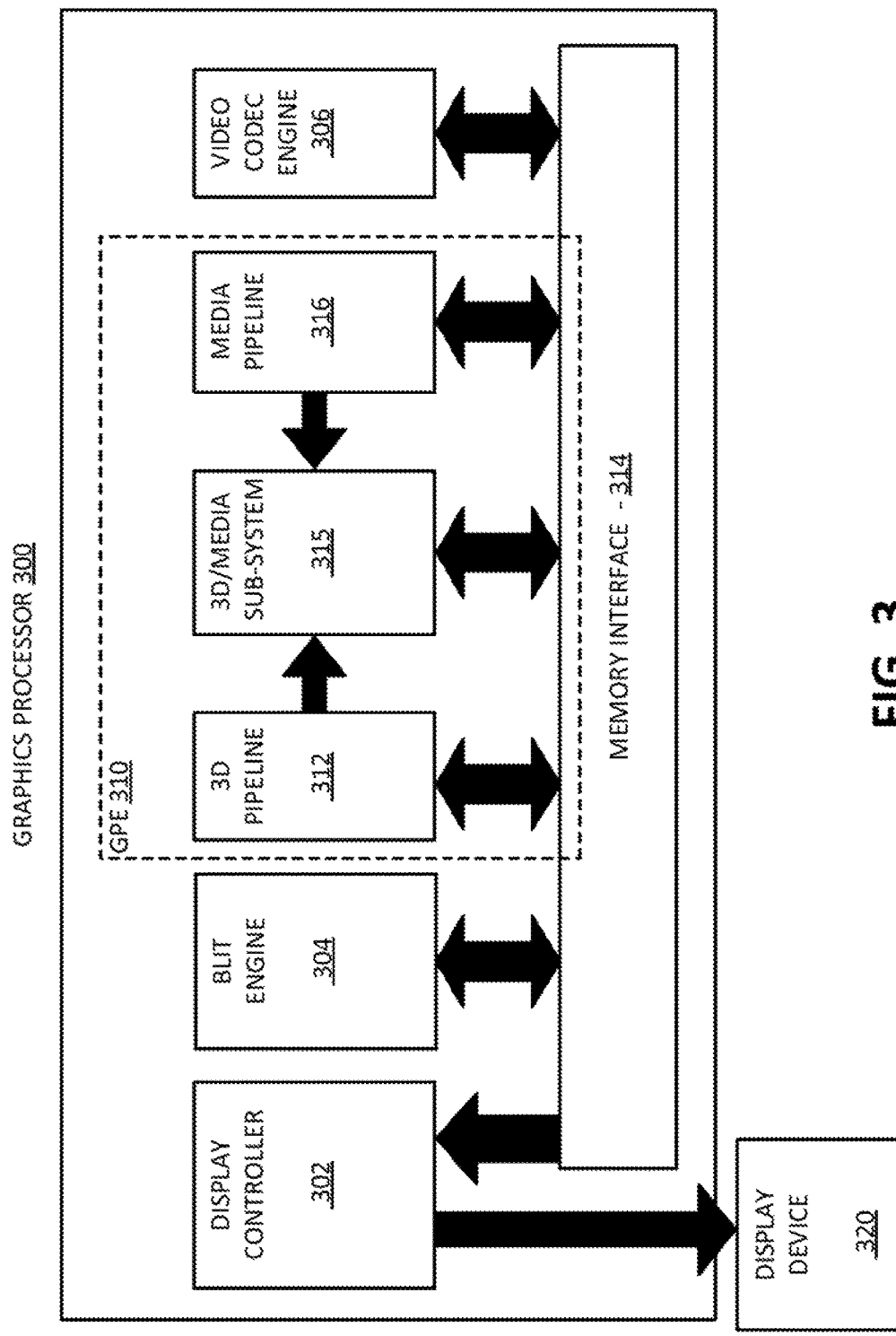
FIG. 3 illustrates a block diagram of a graphics processor which may be a discrete graphics processing unit, or may be graphics processor integrated with a plurality of processing cores, according to some embodiments of the disclosure.

FIG. 3 illustrates a block diagram of one embodiment of a graphics processor 300 which may be a discrete graphics processing unit, or may be graphics processor integrated with a plurality of processing cores. It is pointed out that those elements of FIG. 3 having the same reference numbers (or names) as the elements of any other figure can operate or function in any manner similar to that described, but are not limited to such.

In some embodiments, the graphics processor is communicated with via a memory mapped I/O interface to registers on the graphics processor and via commands placed into the processor memory. In some embodiments, graphics processor 300 includes a memory interface 314 to access memory. In some embodiments, memory interface 314 can be an interface to local memory, one or more internal caches, one or more shared external caches, and/or to system memory.

In some embodiments, graphics processor 300 also includes a display controller 302 to drive display output data to a display device 320. In some embodiments, display controller 302 includes hardware for one or more overlay planes for the display and composition of multiple layers of video or user interface elements. In some embodiments, graphics processor 300 includes video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. In some embodiments, 2D graphics operations are performed using one or more components of the graphics-processing engine (GPE) 310. In some embodiments, GPE 310 is a compute engine for performing graphics operations, including three-dimensional (3D) graphics operations and media operations, etc.

In some embodiments, GPE 310 includes a 3D pipeline 312 for performing 3D operations, such as rendering three-dimensional images and scenes using processing functions that act upon 3D primitive shapes (e.g., rectangle, triangle, etc.). In some embodiments, 3D pipeline 312 includes programmable and fixed function elements that perform various tasks within the element and/or spawn execution threads to 3D/Media sub-system 315. While 3D pipeline 312 can be used to perform media operations, an embodiment of GPE 310 also includes media pipeline 316 that is specifically used to perform media operations, such as video post processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In some embodiments, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Figure 4:
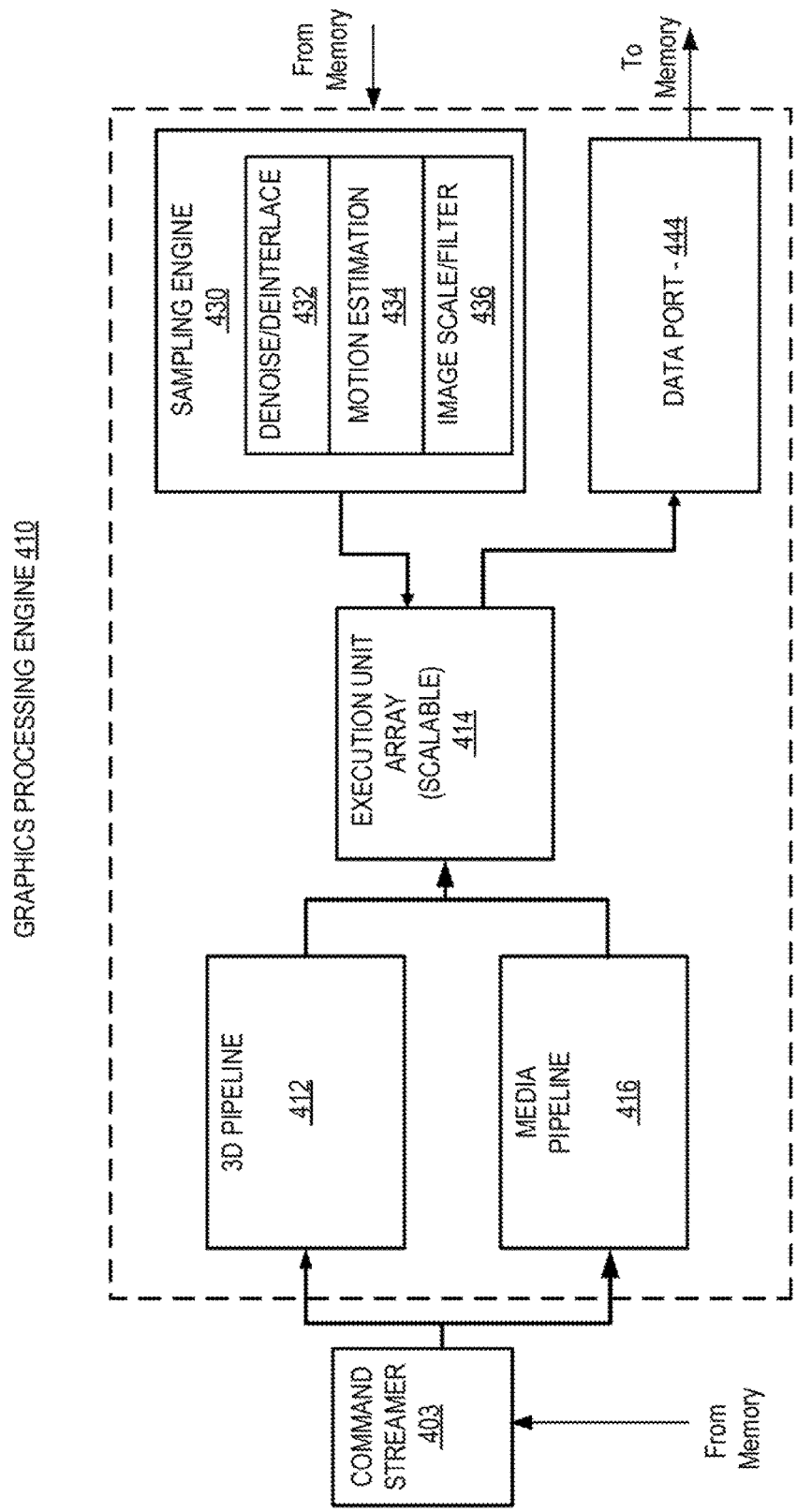
FIG. 4 illustrates a block diagram of a graphics processing engine (GPE) for a graphics processor, according to some embodiments of the disclosure.

FIG. 4 illustrates a block diagram of an embodiment of GPE 410 for a graphics processor. It is pointed out that those elements of FIG. 4 having the same reference numbers (or names) as the elements of any other figure can operate or function in any manner similar to that described, but are not limited to such.

In some embodiments, GPE 410 is a version of the GPE 310 described with reference to FIG. 3. Referring back to FIG. 4, in some embodiments, GPE 410 includes 3D pipeline 412 and media pipeline 416, each of which can be either different from or similar to the implementations of 3D pipeline 312 and media pipeline 316 of FIG. 3.

Referring back to FIG. 4, in some embodiments, GPE 410 couples with command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The 3D and media pipelines process the commands by performing operations via logic within the respective pipelines or by dispatching one or more execution threads to execution unit array 414. In some embodiments, execution unit array 414 is scalable, such that the array includes a variable number of execution units based on the target power and performance level of GPE 410.

In some embodiments, sampling engine 430 couples with memory (e.g., cache memory or system memory) and execution unit array 414. In some embodiments, sampling engine 430 provides a memory access mechanism for scalable execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes de-noise/de-interlace module 432, motion estimation module 434, and image scaling and filtering module 436. In some embodiments, de-noise/de-interlace module 432 includes logic to perform one or more of de-noise or de-interlace algorithms on the decoded video data. The de-interlace logic combines alternating fields of interlaced video content into a single frame of video. The de-noise logic reduces or removes data noise from the video and image data. In some embodiments, the de-noise logic and de-interlace logic are motion adaptive and use spatial or temporal filtering based on the amount of motion detected in the video data. In some embodiments, de-noise/de-interlace module 432 includes dedicated motion detection logic (e.g., within motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses the video motion estimation engine 434 to perform operations on the video at the macro-block level that may otherwise be computationally intensive to perform using a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, GPE 410 includes data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Figure 5:
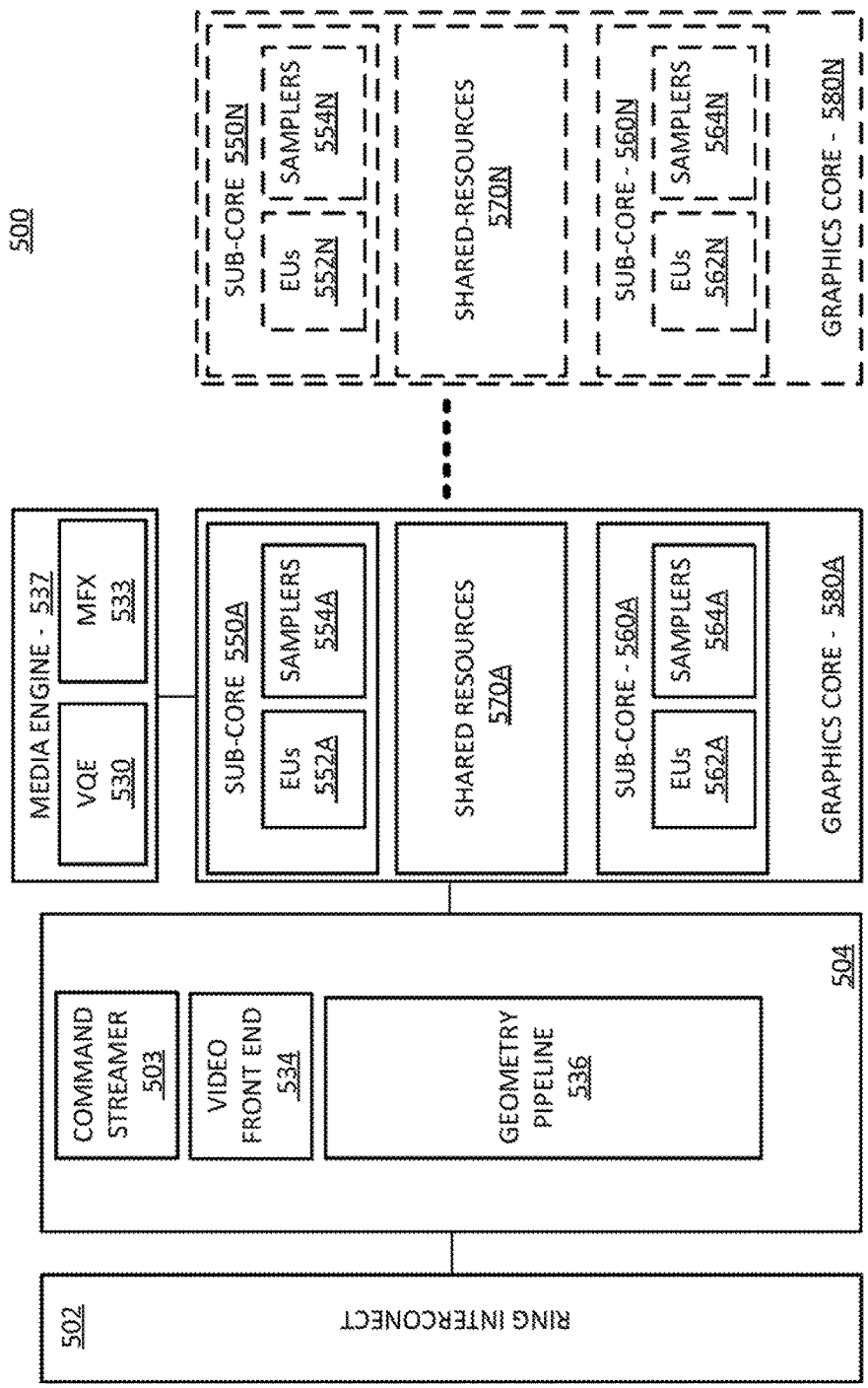
FIG. 5 illustrates a block diagram of another embodiment of a graphics processor related to an execution unit.

FIG. 5 illustrates a block diagram 500 of another embodiment of a graphics processor related to an execution unit. It is pointed out that those elements of FIG. 5 having the same reference numbers (or names) as the elements of any other figure can operate or function in any manner similar to that described, but are not limited to such.

In some embodiments, the graphics processor includes ring interconnect 502, pipeline front-end 504, media engine 537, and graphics cores 580A-N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor receives batches of commands via ring interconnect 502. The incoming commands are interpreted by command streamer 503 in the pipeline front-end 534. The graphics processor includes scalable execution logic to perform 3D geometry processing and media processing via graphics core(s) 580A-N. For 3D geometry processing commands, command streamer 503 supplies the commands to geometry pipeline 536. For at least some media processing commands, command streamer 503 supplies the commands to video front end 534, which couples with a media engine 537. In some embodiments, media engine 537 includes a Video Quality Engine (VQE) 530 for video and image post processing and multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In some embodiments, the graphics processor includes graphics core 580A having at least first sub-core 550A and second core sub-core 560A. In another embodiment, the graphics processor is a low power processor with a single sub-core (e.g., 550A). In some embodiments, the graphics processor includes multiple graphics cores 580A-N, each including a set of first sub-cores 550A-N and a set of second sub-cores 560A-N. Each sub-core in the set of first sub-cores 550A-N includes at least first set of execution units 552A-N and media/texture samplers 554A-N. Each sub-core in the set of second sub-cores 560A-N includes at least a second set of execution units 562A-N and samplers 564A-N. In some embodiments, each sub-core 550A-N, 560A-N shares a set of shared resources 570A-N. In some embodiments, the shared resources include shared cache memory and pixel operation logic. Other shared resources may also be included in the various embodiments of the graphics processor.

Figure 6:
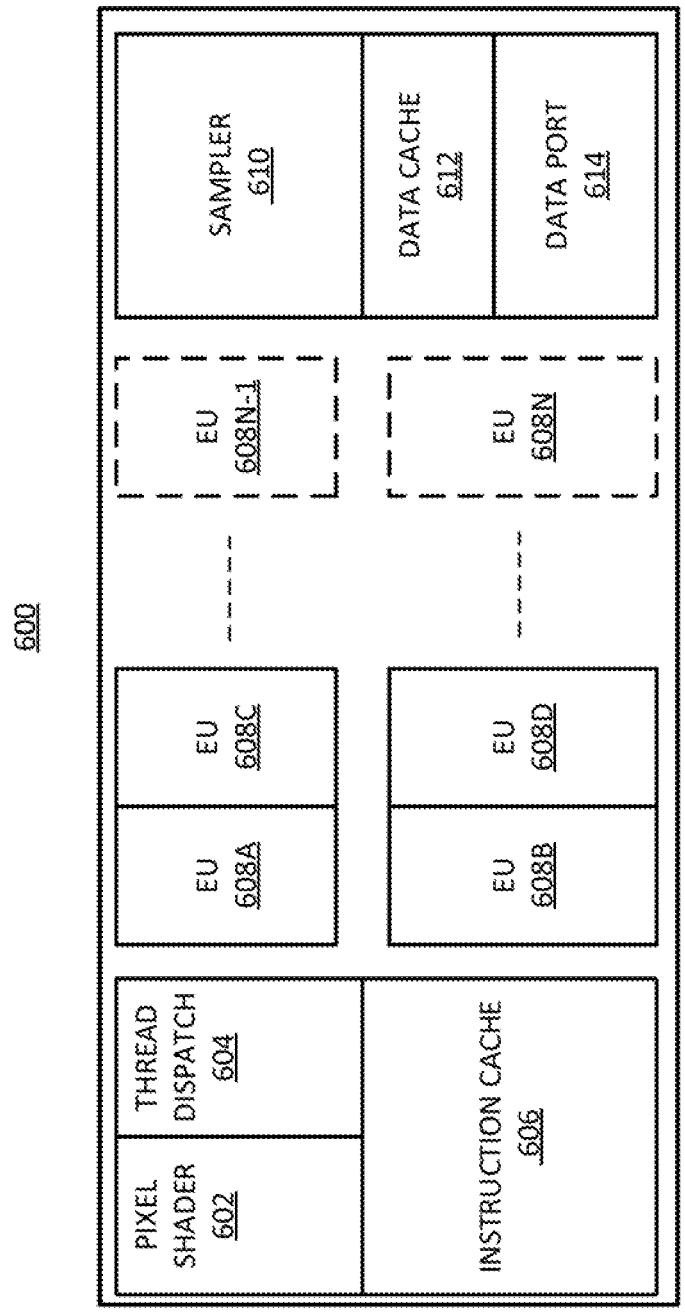
FIG. 6 illustrates thread execution logic including an array of processing elements employed in some embodiments of a GPE.

FIG. 6 illustrates thread execution logic 600 including an array of processing elements employed in one embodiment of a graphics processing engine. It is pointed out that those elements of FIG. 6 having the same reference numbers (or names) as the elements of any other figure can operate or function in any manner similar to that described, but are not limited to such.

In some embodiments, thread execution logic 600 includes pixel shader 602, thread dispatcher 604, instruction cache 606, scalable execution unit array including a plurality of execution units 608A-N, sampler 610, data cache 612, and data port 614. In some embodiments, the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-N. In some embodiments, each execution unit (e.g. 608A) is an individual vector processor capable of executing multiple simultaneous threads and processing multiple data elements in parallel for each thread. In some embodiments, execution unit array 608A-N includes any number of individual execution units.

In some embodiments, execution unit array 608A-N is primarily used to execute "shader" programs. In some embodiments, the execution units in array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quadword (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to thread execution logic 600. Referring back to FIG. 6, in some embodiments, thread dispatcher 604 can also process runtime thread spawning requests from the executing shader programs.

Once a group of geometric objects have been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an API-supplied pixel shader program. To execute the pixel shader program, pixel shader 602 dispatches threads to an execution unit (e.g., 608A) via the thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, data port 614 provides a memory access mechanism for thread execution logic 600 output processed data to memory for processing on a graphics processor output pipeline. In some embodiments, data port 614 includes or couples to one or more cache memories (e.g., data cache 612) to cache data for memory access via the data port.

Figure 7:
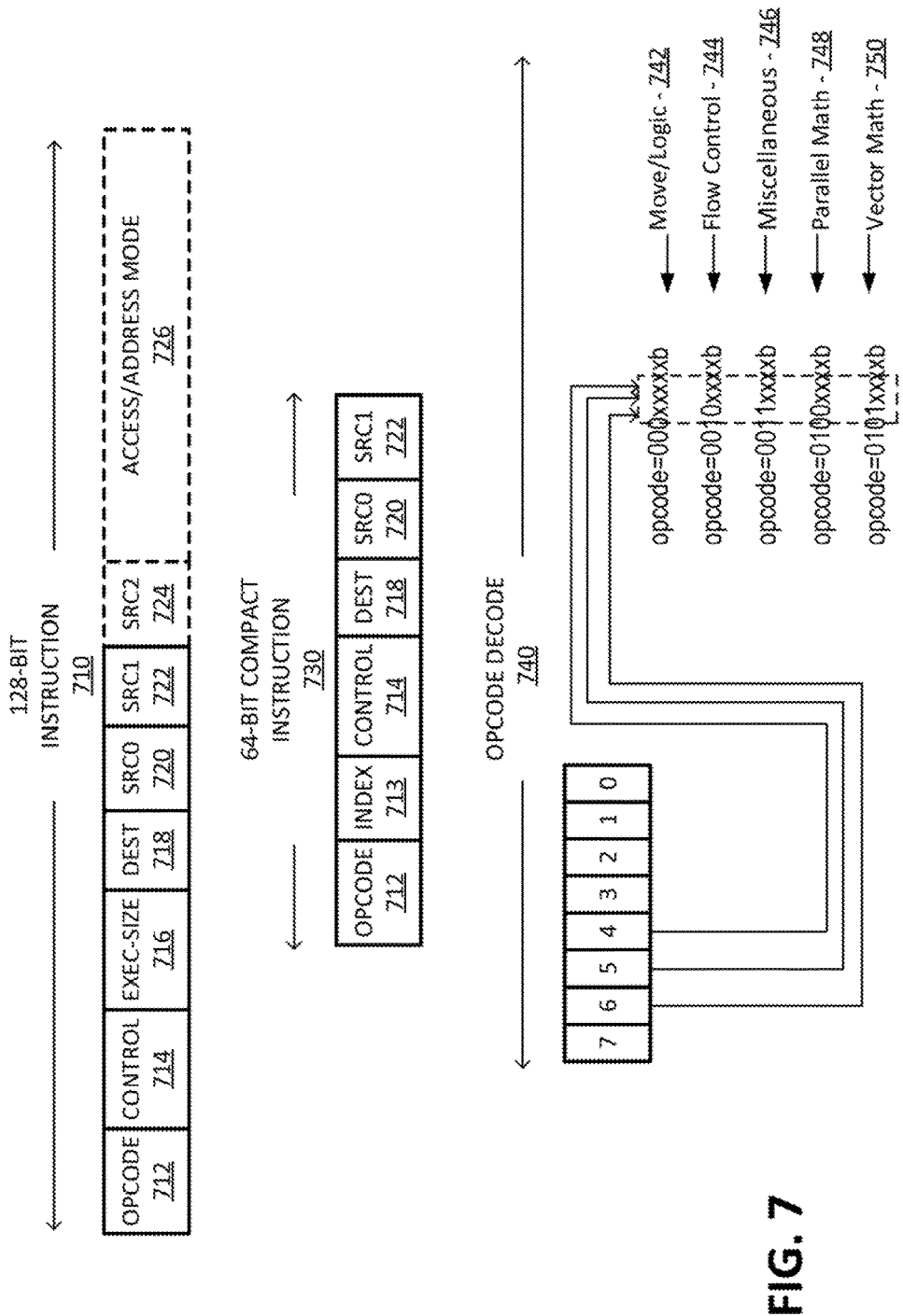
FIG. 7 illustrates a block diagram illustrating a graphics processor execution unit instruction format, according to some embodiments of the disclosure.

FIG. 7 illustrates a block diagram illustrating a graphics processor execution unit instruction format 700, according to some embodiments of the disclosure. In some embodiments, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format 700 described as illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730. Here, the access or address mode is expressed in field 726.

Some execution unit instructions have up to three operands including two source (src) operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, instructions are grouped based on opcode bit-fields to simplify Opcode decode 740. For an 8-bit opcode, bits 4, 5, and 6 allow the execution unit to determine the type of opcode. The precise opcode grouping shown is just an example. In some embodiments, move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb (e.g., 0x0x) and logic instructions are in the form of 0001xxxxb (e.g., 0x01). A flow control instruction group 744 (e.g., call, jump (jmp), etc.,) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
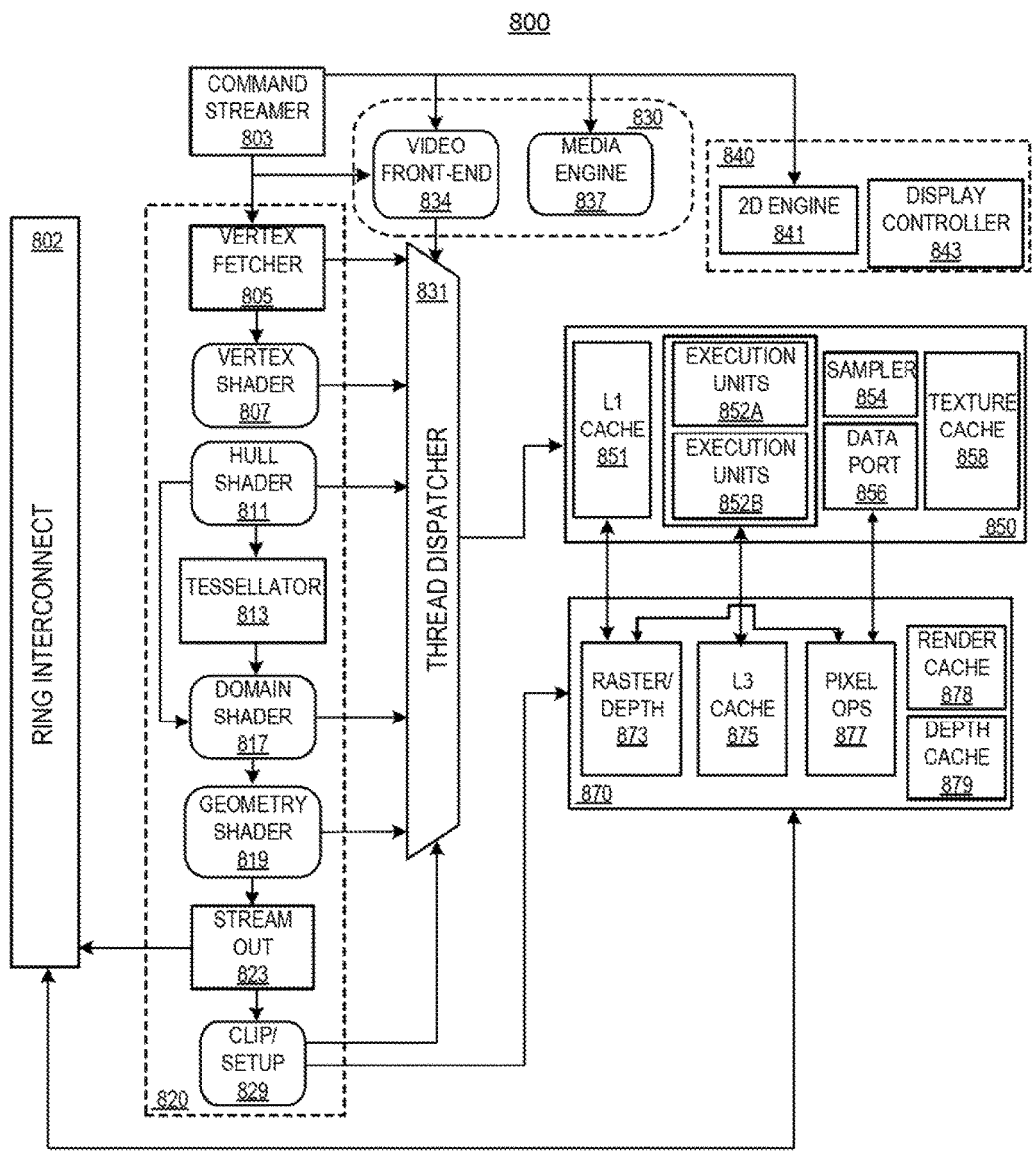
FIG. 8 is a block diagram of another embodiment of a graphics processor which includes graphics pipeline, media pipeline, display engine, thread execution logic, and render output pipeline.

FIG. 8 is a block diagram 800 of another embodiment of a graphics processor which includes graphics pipeline 820, media pipeline 830, display engine 840, thread execution logic 850, and render output pipeline 870. It is pointed out that those elements of FIG. 8 having the same reference numbers (or names) as the elements of any other figure can operate or function in any manner similar to that described, but are not limited to such.

In some embodiments, the graphics processor is a graphics processor within a multi-core processing system that includes one or more general purpose processing cores. The graphics processor is controlled by register writes to one or more control registers (not shown) or via commands issued to the graphics processor via ring interconnect 802. In some embodiments, ring interconnect 802 couples the graphics processor to other processing components, such as other graphics processors or general-purpose processors. Commands from ring interconnect 802 are interpreted by command streamer 803 which supplies instructions to individual components of graphics pipeline 820 or media pipeline 830.

In some embodiments, command streamer 803 directs the operation of a vertex fetcher 805 component that reads vertex data from memory and executes vertex-processing commands provided by command streamer 803. In some embodiments, vertex fetcher 805 provides vertex data to vertex shader 807, which performs coordinate space transformation and lighting operations to each vertex. In some embodiments, vertex fetcher 805 and vertex shader 807 execute vertex-processing instructions by dispatching execution threads to execution units 852A, 852B via thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. In some embodiments, if tessellation is not used, the tessellation components 811, 813, and 817 can be bypassed.

In some embodiments, the complete geometric objects can be processed by geometry shader 819 via one or more threads dispatched to execution units 852A, 852B, or can proceed directly to clipper 829 (for example, by stream out block 823). In some embodiments, geometry shader 819 operates on the entire geometric objects, rather than the vertices or patches of vertices as in the previous stages of the graphics pipeline. If the tessellation is disabled, geometry shader 819 receives input from vertex shader 807. In some embodiments, geometry shader 819 is programmable by a geometry shader program to perform geometry tessellation if the tessellation units are disabled.

Prior to rasterization, vertex data is processed by clipper 829, which is either a fixed function clipper or a programmable clipper having clipping and geometry shader functions. In some embodiments, rasterizer 873 in render output pipeline 870 dispatches pixel shaders to convert the geometric objects into their per pixel representations. In some embodiments, pixel shader logic is included in thread execution logic 850.

The graphics engine has an interconnect bus, interconnect fabric, or some other interconnect mechanism that allows data and message passing amongst the major components of the graphics engine. In some embodiments, execution units 852A, 852B and associated cache(s) 851, texture and media sampler 854, and texture/sampler cache 858 interconnect via data port 856 to perform memory access and communicate with render output pipeline components of the graphics engine. In some embodiments, sampler 854, caches 851, 858, and execution units 852A, 852B each have separate memory access paths.

In some embodiments, render output pipeline 870 contains a rasterizer and depth test component 873 that converts vertex-based objects into their associated pixel-based representation. In some embodiments, the rasterizer logic includes a windower/masker unit to perform fixed function triangle and line rasterization. An associated render and depth buffer caches 878, 879 are also available in one embodiment. In some embodiments, pixel operations component 877 performs pixel-based operations on the data, though in some instances, pixel operations associated with 2D operations (e.g. bit block image transfers with blending) are performed by 2D engine 841, or substituted at display time by display controller 843 using overlay display planes. In some embodiments, a shared L3 cache 875 is available to all graphics components, allowing the sharing of data without the use of main system memory.

In some embodiments, graphics processor media pipeline 830 includes media engine 337 and video front end 834. In some embodiments, video front end 834 receives pipeline commands from command streamer 803. In some embodiments, media pipeline 830 includes a separate command streamer. In some embodiments, video front-end 834 processes media commands before sending the command to media engine 837. In some embodiments, the media engine includes thread spawning functionality to spawn threads for dispatch to thread execution logic 850 via thread dispatcher 831.

In some embodiments, the graphics engine includes display engine 840. In some embodiments, display engine 840 is external to the graphics processor and couples with the graphics processor via ring interconnect 802, or some other interconnect bus or fabric. In some embodiments, display engine 840 includes 2D engine 841 and display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates the API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 9A:
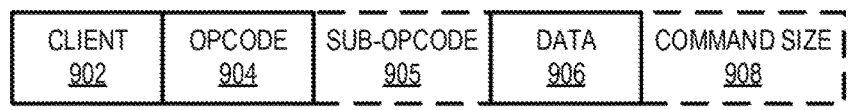
FIG. 9A illustrates a block diagram illustrating a graphics processor command format, according to some embodiments.
Figure 9B:
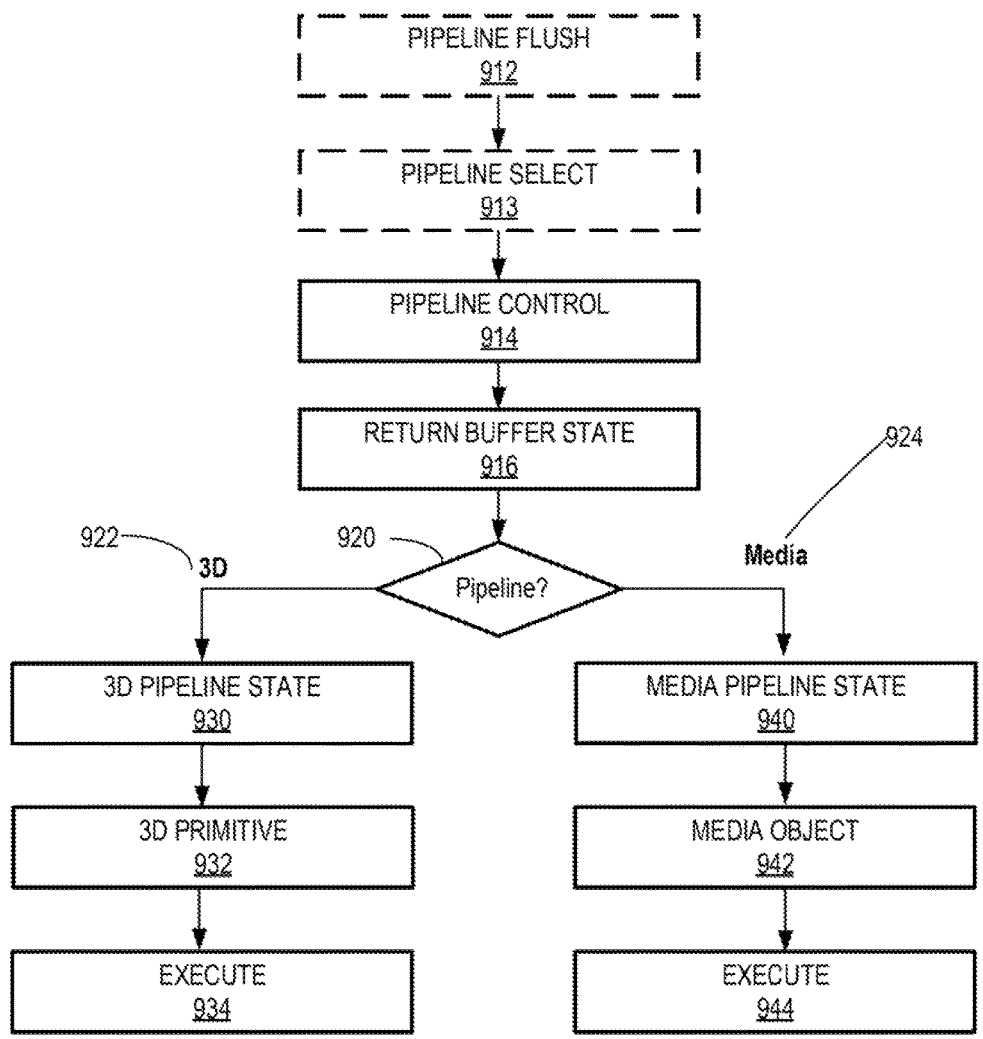
FIG. 9B illustrates a block diagram of a graphics processor command sequence, according to some embodiments of the disclosure.

FIG. 9A illustrates a block diagram illustrating a graphics processor command format 900, according to some embodiments, and FIG. 9B illustrates a block diagram of a graphics processor command sequence 910 according to some embodiments of the disclosure. It is pointed out that those elements of FIGS. 9A-B having the same reference numbers (or names) as the elements of any other figure can operate or function in any manner similar to that described, but are not limited to such.

The solid lined boxes in FIG. 9A illustrate the components that are generally included in a graphics command while the dashed lines include components that are optional or that are only included in a sub-set of the graphics commands. The example graphics processor command format 900 of FIG. 9A includes data fields to identify target client 902 of the command, command operation code (opcode) 904, and relevant data 906 for the command. In some embodiments, sub-opcode 905 and command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads opcode 904 and, if present, sub-opcode 905 to determine the operation to perform. The client unit performs the command using information in data 906 field of the command. For some commands, an explicit command size 908 is expected to specify the size of the command. In some embodiments, the command parser automatically determines the size of at least some of the commands based on the command opcode. In some embodiments, commands are aligned via multiples of a double word.

In some embodiments, flow chart in FIG. 9B shows a sample command sequence 910. Although the blocks in flowchart 910 are shown in a particular order, the order of the actions can be modified. Thus, the illustrated embodiments can be performed in a different order, and some actions/blocks may be performed in parallel. Some of the blocks and/or operations listed are optional in accordance with certain embodiments. The numbering of the blocks presented is for the sake of clarity and is not intended to prescribe an order of operations in which the various blocks must occur. Additionally, operations from the various flows may be utilized in a variety of combinations.

In some embodiments, software or firmware of a data processing system that features an embodiment of the graphics processor uses a version of the command sequence shown to set up, execute, and terminate a set of graphics operations. A sample command sequence is shown and described for illustrative purposes, however embodiments are not limited to these commands or to this command sequence. Moreover, the commands may be issued as batch of commands in a command sequence, such that the graphics processor will process the sequence of commands in an at least partially concurrent manner.

In some embodiments, sample command sequence 910 may begin with pipeline flush command 912 to cause any active graphics pipeline to complete the currently pending commands for the pipeline. In some embodiments, 3D pipeline 922 and media pipeline 924 do not operate concurrently. The pipeline flush is performed to cause the active graphics pipeline to complete any pending commands. In some embodiments, in response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, pipeline select command 913 is used when a command sequence requires the graphics processor to explicitly switch between pipelines. In some embodiments, pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, pipeline control command 914 configures a graphics pipeline for operation and is used to program 3D pipeline 922 and media pipeline 924. In some embodiments, pipeline control command 914 configures the pipeline state for the active pipeline. In some embodiments, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. In some embodiments, return buffer state 916 includes selecting the size and number of return buffers to use for a set of pipeline operations.

The remaining commands in the command sequence differ based on the active pipeline for operations. Based on pipeline determination 920, the command sequence is tailored to 3D pipeline 922 beginning with 3D pipeline state 930, or media pipeline 924 beginning at media pipeline state 940.

The commands for 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via 3D primitive 932 command are forwarded to the vertex fetch function in the graphics pipeline. The vertex fetch function uses 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via execute 934 command or event. In some embodiments, a register write triggers command execution. In some embodiments, execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, sample command sequence 910 follows media pipeline 924 path when performing media operations. In general, the specific use and manner of programming for media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In some embodiments, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as 3D pipeline 922. A set of media pipeline state commands 940 are dispatched or placed into a command queue before media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline state must be valid before issuing media object command 942. Once the pipeline state is configured and media object commands 942 are queued, media pipeline 924 is triggered via execute 944 command or an equivalent execute event (e.g., register write). Output from media pipeline 924 may then be post processed by operations provided by 3D pipeline 922 or media pipeline 924. In some embodiments, GPGPU operations are configured and executed in a similar manner as media operations.

Figure 10:
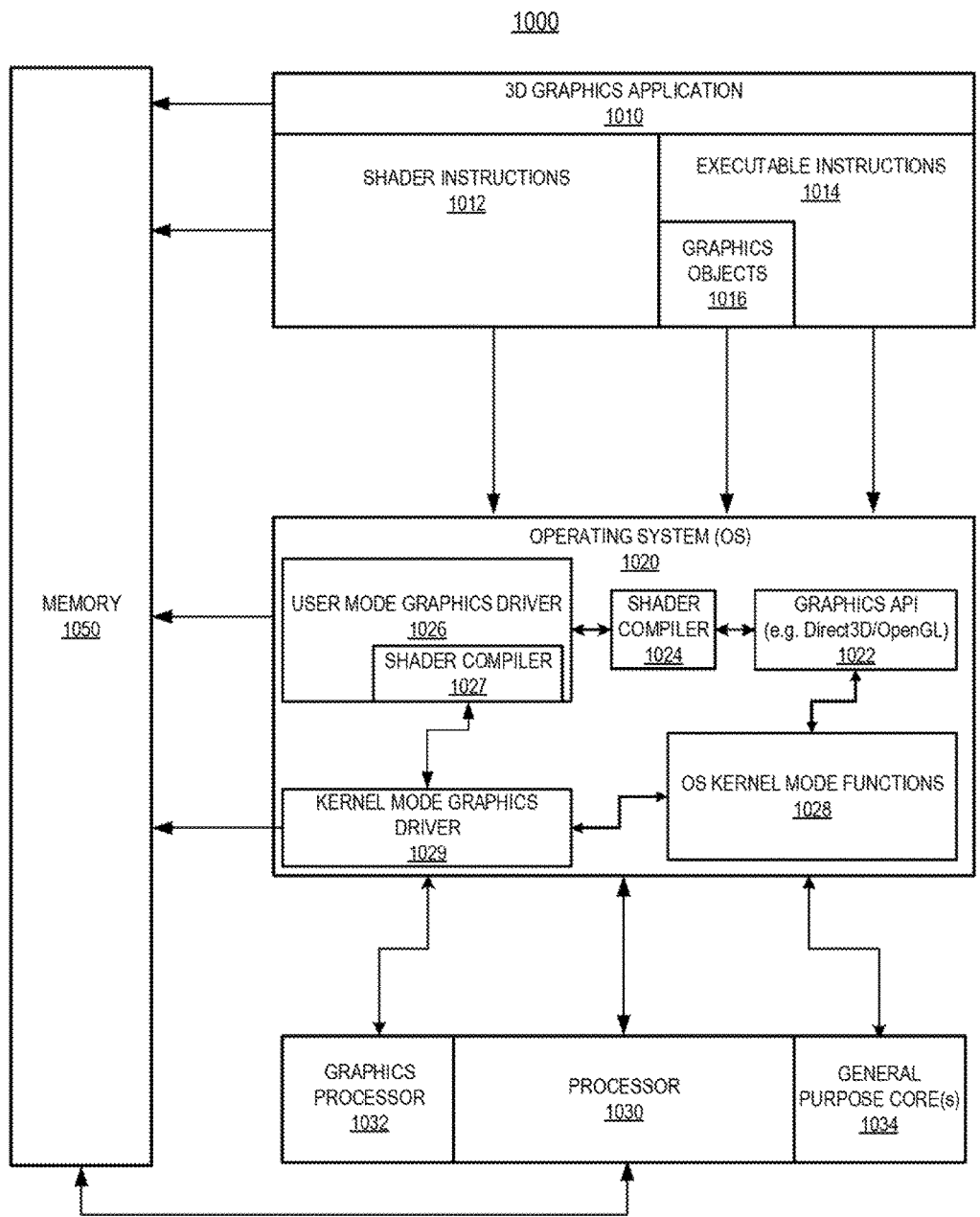
FIG. 10 illustrates a graphics software architecture for a data processing system according to some embodiments of the disclosure.

FIG. 10 illustrates a graphics software architecture 1000 for a data processing system according to some embodiments of the disclosure. It is pointed out that those elements of FIG. 10 having the same reference numbers (or names) as the elements of any other figure can operate or function in any manner similar to that described, but are not limited to such.

In some embodiments, software architecture includes 3D graphics application 1010, operating system 1020, and at least one processor 1030. In some embodiments, processor 1030 includes graphics processor 1032 and one or more general-purpose processor core(s) 1034. In some embodiments, graphics application 1010 and operating system 1020 each execute in system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 may be a Microsoft® Windows® operating system from the Microsoft Corporation, a proprietary UNIX-like operating system, or an open source UNIX-like operating system using a variant of the Linux kernel. When the Direct3D API is in use, operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of 3D graphics application 1010.

In some embodiments, user mode graphics driver 1026 may contain a back-end shader compiler 1027 to convert shader instructions 1012 into a hardware specific representation. When the OpenGL API is in use, shader instructions 1012 in the GLSL high-level language are passed to user mode graphics driver 1026 for compilation. In some embodiments, user mode graphics driver 1026 uses operating system kernel mode functions 1028 to communicate with kernel mode graphics driver 1029. In some embodiments, kernel mode graphics driver 1029 communicates with graphics processor 1032 to dispatch commands and instructions. In some embodiments, operating system kernel mode functions 1028 is used to communicate with Graphics API (e.g., Direct3D/OpenGL) 1022.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the disclosure should be measured solely by reference to the claims that follow.

For purposes of illustrating the shared resource management through credit management, the example of Translation Lookaside Buffer (TLB) is used. In this example, a number of TLB engines receive requests to access a shared resource (e.g., memory 1050). However, the embodiments are not limited to TLB engines and memory 1050 being the shared resource. In other embodiments, other engines that may want to access a shared resource can use the apparatus of credit management for managing access to the shared resource. For example, rendering engine, 2D engine 841, media engine 537, etc. may want to access shared resources such as Shared Resources 570A-N, and may use the credit management (static and/or dynamic) apparatus or means for managing access to the shared resources.

Figure 11:
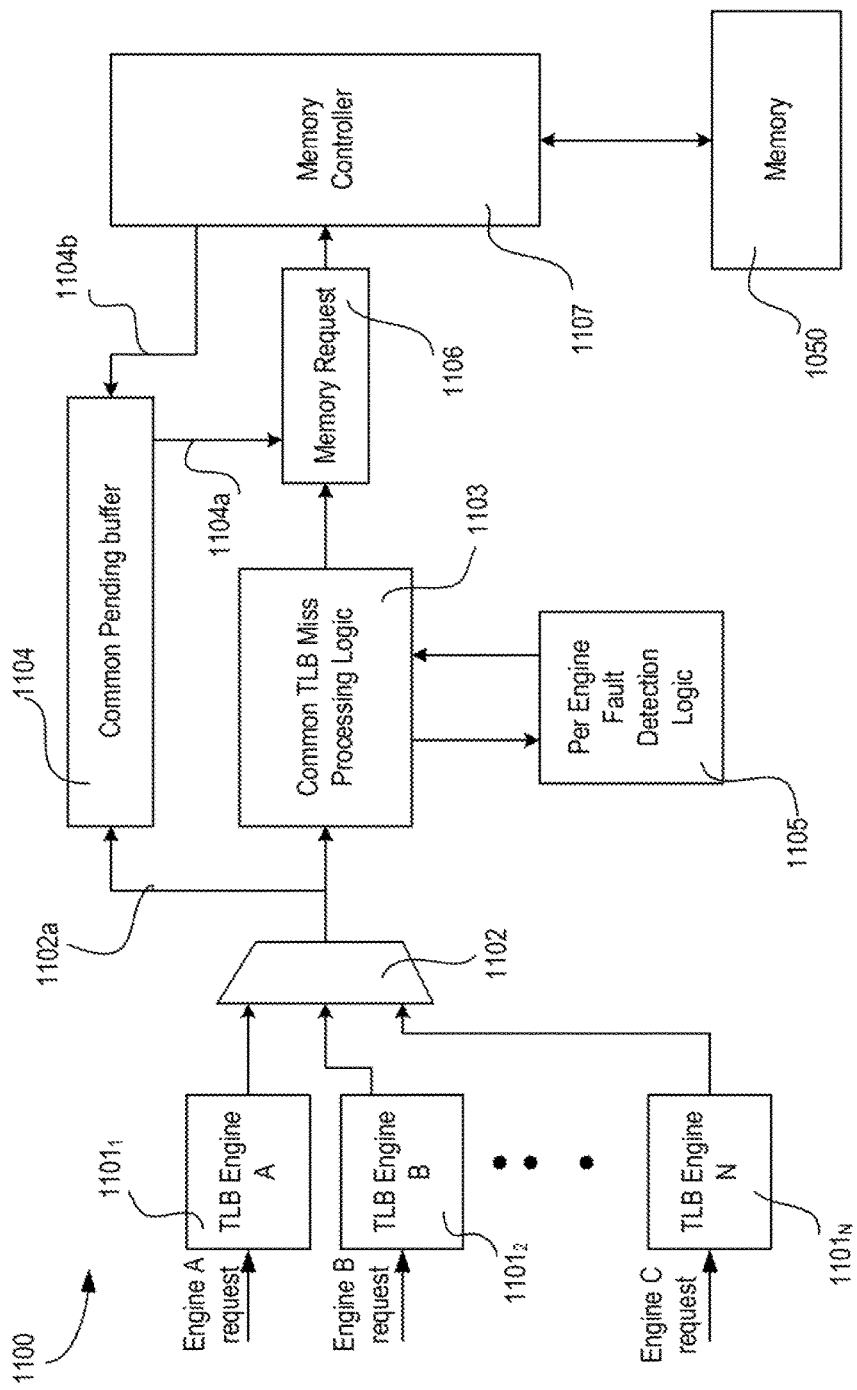
FIG. 11 illustrates a part of a graphics engine with multiple Translation Lookaside Buffer (TLB) engines accessing system memory using common pending buffer (CPB).

FIG. 11 illustrates apparatus 1100 showing a part of a graphics engine with multiple TLB engines accessing system memory using common pending buffer (CPB). It is pointed out that those elements of FIG. 11 having the same reference numbers (or names) as the elements of any other figure can operate or function in any manner similar to that described, but are not limited to such.

Apparatus 1100 includes TLB engines $1101_{1-N}$, where 'N' is an integer, multiplexer 1102, Common TLB Miss Processing Logic 1103, Common Pending buffer (CPB) 1104, Per Engine Fault Detection Logic 1105, Memory Request logic 1106, Memory Controller 1107, and Memory 1050. In some embodiments, Memory Controller 1107 is integrated in the GPU (graphics processor unit). For example, Memory Controller 1107 is on the same die as the GPU. In some embodiments, Memory Controller 1107 is separate from the GPU (e.g., Memory Controller 1107 is external to the GPU). In some embodiments, Memory 1050 is a system memory and is a shared resource.

The TLB Engines $1101_{1-N}$ are coupled to multiplexer 1102 which selectively provides engine requests to Common TLB Miss Processing Logic 1103 and CPB 1104. A Per Engine Fault Detection Logic 1105 is coupled to Common TLB Miss Processing Logic 1103. The Per Engine Fault Detection Logic 1105 identifies when an engine request results in a memory page fault, for example. The Memory Request Logic 1106 is coupled to CPB 1104 and Common TLB Miss Processing Logic 1103. The Memory Controller 1107 is coupled to Memory Request 1106, CPB 1104, and Memory 1050. CPB 1104 receives TLB requests via 1102a, which provides engine requests one at a time to CPB 1104. The output 1104a of CPB 1104 is the final memory request provided to Memory Request Logic 1106. Memory Request Logic 1106 then schedules that final memory request to Memory Controller 1107, which accesses memory 1050. Once the memory access process completes, a TLB completion message is sent over 1104b to CPB 1104.

In apparatus 1100, there are 'N' separate engine requests (e.g., Engine A request for TLB Engine A $1101_1$, Engine B request for TLB Engine B $1101_2$, Engine N request for TLB Engine N $1101_N$) that go through individual TLB pipelines (not shown), to Common TLB Miss Processing Logic 1103 via Multiplexer 1102. Common TLB Miss Processing Logic 1103 uses CPB 1104 to hold cycles whose TLB walks are pending. As part of the TLB processing, a page fault could occur, which may block the completion of said processing. Those cycles may sit and accumulate in CPB 1104, waiting for some page fault handler to fix this fault. This unbounded accumulation of cycles in CPB 1104 could block the whole fabric, including the TLB internal pipeline (e.g., a pipeline internal to a TLB Engine). Here, fabric refers to buffers and/or interconnects.

As a result, if the faults are not fixed, the whole fabric could be blocked by just one engine. This is a serious quality of service (QoS) issue, as one engine can affect or deny the forward progress of another independent engine. Furthermore, it is possible that in order for the fault to be fixed, a previously scheduled TLB invalidation must complete. But this invalidation could require the fabric to be temporarily clean in order to complete. So this constitutes a deadlock scenario where CPB 1104 needs the fault to be fixed, and the fault cannot be fixed due to a previously queued engine request. The deadlock scenario is further exacerbated because the invalidation cannot complete because the fabric is full of pending cycles, waiting for CPB 1104 to be available. Architectures that use this flow, limit the applicable workloads, which can be run, to those that have pinned pages and not encounter page faults.

In order to prevent this kind of scenario, in some embodiments, a cycle from the Engine requests can be serviced, if there is a guaranteed space for it in CPB 1104. In the case of TLB hits, the Common TLB Miss Processing Logic 1103 and resources are not needed. But, when an engine request is selected by Multiplexer 1102 for service, the worst case is assumed and TLB miss processing resources (e.g., Common TLB Miss Processing Logic 1103) are available for it, if the request happens to need them. If the resources are not needed (e.g., the request hits the TLB), the credit is released right away, in accordance with some embodiments.

This could be achieved by stalling the Engine request when the total number of inflight cycles could potentially reach the number of entries available in CPB 1104, in accordance with some embodiments. Sometimes due to the physical dimension of a real system, the information is not readily available, and collecting it at the request port may not be feasible while still meeting the aggressive cycle time that these systems should comply with. In some embodiments, guard bands are added for shared resource management. These guard bands may, for a given the number of engines and blocks on the system, end up consuming most or all of the available buffer. In some embodiments, the above problem of using the available buffer for the involved guard band can be resolved by increasing the size of CPB 1104.

Figure 12:
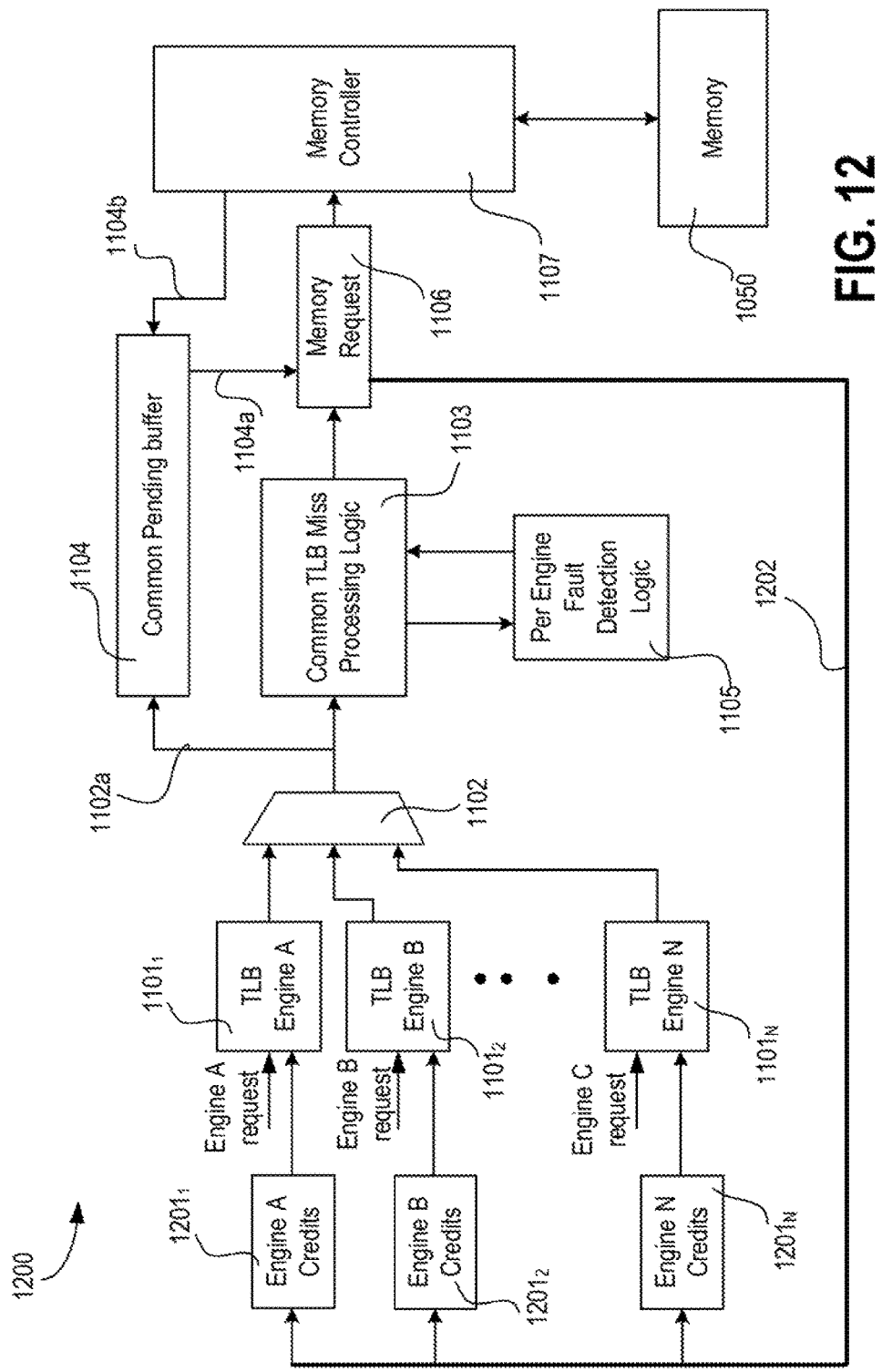
FIG. 12 illustrates a part of a graphics engine with multiple TLB engines accessing system memory using CPB and apparatus for shared resource partitioning through static credit management, according to some embodiments of the disclosure.

FIG. 12 illustrates apparatus 1200 showing a part of a graphics engine with multiple TLB engines accessing system memory using common pending buffer (CPB) and apparatus for shared resource partitioning through static credit management, according to some embodiments of the disclosure. It is pointed out that those elements of FIG. 12 having the same reference numbers (or names) as the elements of any other figure can operate or function in any manner similar to that described, but are not limited to such.

In some embodiments, engine credit registers $1201_{1-N}$ are provided for each engine. For example, engine credit register $1201_1$ is provided to store a certain number of credits for TLB Engine A. In some embodiments, the series of credits stored in engine credit registers $1201_{1-N}$ represent a slot in CPB 1104. In some embodiments, when there are independent multiple shared resources, then each engine may have a separate credit register associated with that shared resource. For example, if there are independent multiple shared resources in the Common TLB Miss Processing Logic 1103, a separate credit is defined for each shared resource.

In some embodiments, a credit is required for an Engine to be able to send a request. In some embodiments, when the credits are consumed with each request, a slot in CPB 1104 is guaranteed. In some embodiments, a logic (e.g., first logic) is provided to subtract one or more credits from the engine credit registers as the credit is used by the engine to send the engine request to CPB 1104. For example, when TLB Engine A $1101_1$ sends an engine request to CPB 1104 (which guarantees a slot in the buffer), the logic subtracts a credit from Engine A Credit register $1201_1$. In some embodiments, this logic (e.g., the first logic) resides in Engine Credit register (e.g., $1201_1$). However, the embodiments are not limited to such, and the logic can be located in any suitable location as part of other logics.

In some embodiments, once an engine has consumed all its credits, it will stall, until more credits are made available to it. For example, when TLB Engine A $1101_1$ consumes all its credits stored in Engine A Credits register $1201_1$, further processing of new Engine A requests are stalled until new or more credits are provided over 1202 to Engine A Credits register $1201_1$.

In some embodiments, once a cycle is no longer using CPB 1104, the credit is released to be reused for another engine request. This released credit is provided by Memory Request Logic 1106 via 1202 back to the credit registers $1201_{1-N}$, in accordance with some embodiments. In some embodiments, a logic (e.g., second logic) is provided to release credits back to an engine credit register after the request associated with that engine is serviced by CPB 1104. For example, when Engine A request is serviced by Memory Controller 1107, Memory Controller 1107 sends a TLB completion message 1104b to CPB 1104 which notifies the second logic to release one credit back to Engine A Credits register $1201_1$. In some embodiments, this logic (e.g., the second logic) resides in Engine Credit register (e.g., $1201_1$). However, the embodiments are not limited to such, and the logic can be located in any suitable location as part of other logics. In some embodiments, the total number of credits in all credit registers match the bit size of CPB 1104.

In some embodiments, the initial credit count for each engine is allocated statically through configuration registers. For example, a fixed number (or a predetermined number) of credits are allocated to the credit registers $1201_{1-N}$ through configuration registers at the time of power-up. In some embodiments, the number of credits for various engines and shared resources is programmed according to the application (e.g., video rendering) executing on the GPU. For example, if an engine is to handle many known requests while another engine is rarely going to handle requests, then the engine to handle more requests may be allocated more fixed credits than the other engine.

In some embodiments, the programmed number of credits may not change until the next time the configuration registers are reprogrammed. In some embodiments, the configuration registers are reprogrammed or programmed via the operating system using any suitable mechanism. In some embodiments, each of the credit registers $1201_{1-N}$ have a minimum number of credits at all times, and once the number of credits reaches the minimum number (because the credits are consumed), then the credit register is refilled with released credits. In some embodiments, the minimum number of credits are left for high priority use of credits for servicing an engine request without having to wait for credit release.

Figure 13:
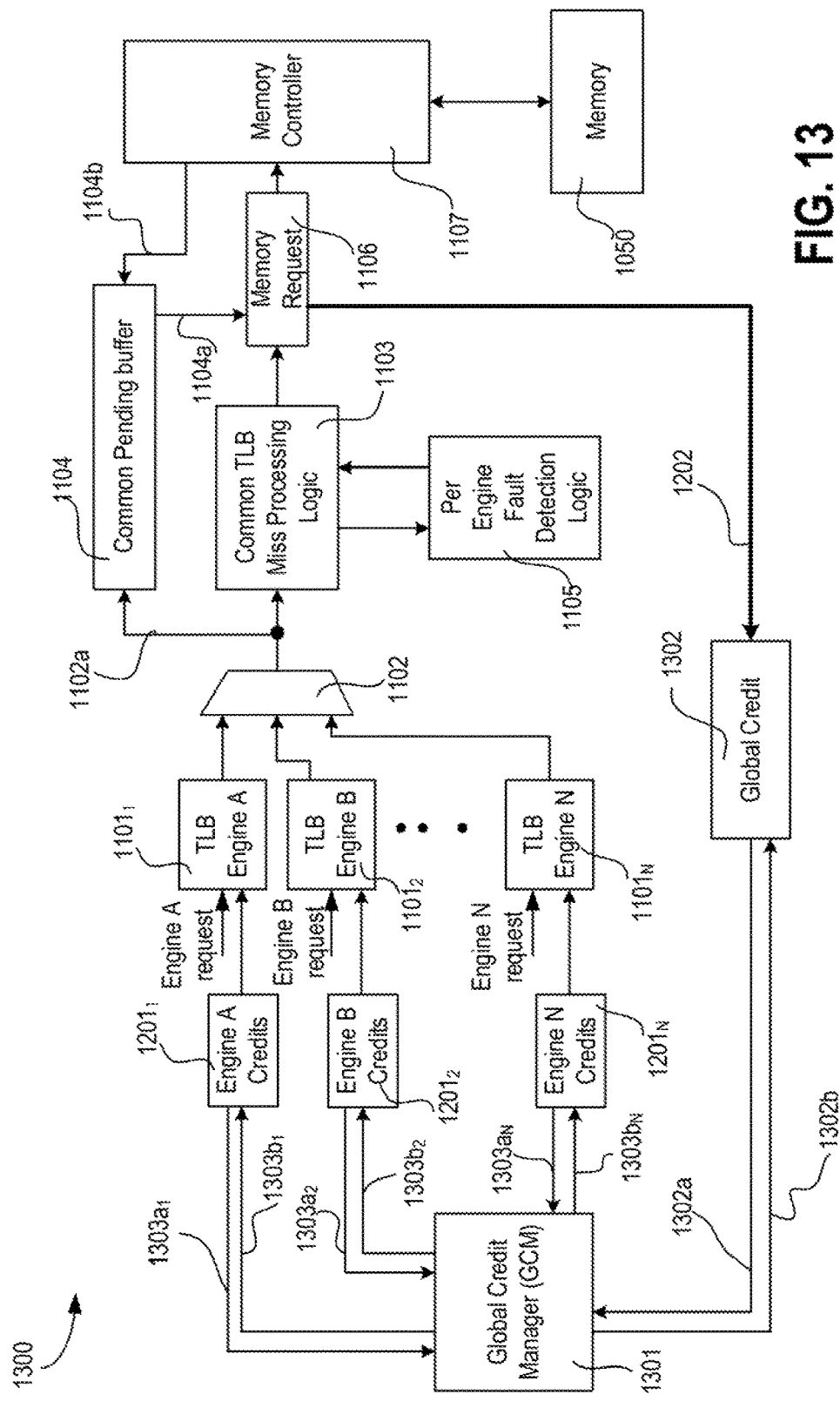
FIG. 13 illustrates a part of a graphics engine with multiple TLB engines accessing system memory using CPB and apparatus for shared resource partitioning through dynamic credit management, according to some embodiments of the disclosure.

FIG. 13 illustrates apparatus 1300 showing a part of a graphics engine with multiple TLB engines accessing system memory using CPB 1103 and apparatus for shared resource partitioning through dynamic credit management, according to some embodiments of the disclosure. It is pointed out that those elements of FIG. 13 having the same reference numbers (or names) as the elements of any other figure can operate or function in any manner similar to that described, but are not limited to such.

In some embodiments, apparatus 1300 comprises Global Credit Manager or Controller (GCM) 1301 and Global Credit resister (GCP) or pool 1302. In some embodiments, credits are dynamically allocated for the engines that are active. Here, active engines refer to those engines that have pending requests to service. Inactive engines are those engines that have no pending requests and therefore may not need credits to service any request.

In one instance, credits in credit registers $1201_{1-N}$ are dynamically allocated by GCM 1301 when TLB Engines $1101_{1-N}$ are active. In some embodiments, GCP 1302 maintains any credits which are released as the engine requests are serviced. In some embodiments, for inactive engines, credits are withheld and not allocated. These credits are maintained in GCP 1302. These credits can then be allocated to any credit registers $1201_{1-N}$ that needs them. For example, if Engine A Credits in credits register $1201_1$ are mostly used and there are no new requests for Engine A $1101_1$, then GCM 1301 may chose not to refill the credits to credits register $1201_1$ and instead provide the credits to another credits register that expects to use those credits for upcoming engine requests.

In some embodiments, the total number of credits, per-engine plus global credits is equal to the bit size of CPB 1104. In some embodiments, credits in GCP 1302 are managed by the GCM 1301. In some embodiments, GCM 1301 sends any unused credits or released credits back to GCP 1302 via 1302b. In some embodiments, when GCM 1301 determines that an engine needs credits because it received an engine request that needs servicing, GCM 1301 gets credits from GCP 1302 via 1302a and provides it to the concerned engine credit register.

In some embodiments, credit release and credit grant interfaces are provided by GCM 1301 for each engine credit register. For example, released credits from Engine A credits register $1201_1$ are received by GCM via $1303a_1$ while grant credits are provided from GCM 1301 to Engine A credits register $1201_1$ via $1303a_2$. Similarly, released credits from Engine B credits register $1201_2$ are received by GCM via $1303a_2$ while grant credits are provided from GCM 1301 to Engine A credits register $1201_2$ via $1303a_2$, and released credits from Engine N credits register $1201_N$ are received by GCM via $1303a_N$ while grant credits are provided from GCM 1301 to Engine A credits register $1201_N$ via $1303b_N$.

In some embodiments, when an engine gets a new request, its remaining credit count is going to decrease, and when it falls below a programmable minimum amount, it makes a request to GCM 1301 for more credits. In some embodiments, if GCM 1301 has credits available (from the global credits pool 1302), it will grant the credit request to the engine. For example, Engine A credits register may receive grant of credit request via 1303$b_1$.

In some embodiments, GCM 1301 may grant credits in bulk or individually for each single engine request. In some embodiments, when the engine receives the GCM grant, it increases its corresponding credit count by the amount granted, while GCM 1301 decreases the global credit pool count by the same amount. In some embodiments, the minimum number of credits defined for each engine and the bulk credit release, are tuned to allow streaming from one engine without incurring stalls.

In some embodiments, when a credit is consumed by CPB 1104, that credit is added to GCP 1302. In some embodiments, for the credits from an engine to release to GCP 1302, each engine may additionally advertise the number of unused credits. In some embodiments, GCM 1301 may request engines with unused credits to release the unused credits to GCP 1302. In some embodiments, the credit release criteria is when another engine is requesting credits. In some embodiments, the credit release criteria is a time-out for unused credits. By having this credit revoking mechanism, GCM 1301 can optimally use the available shared resources, and grant the bulk of the credits to the active engine, in accordance with some embodiments.

In some embodiments, this dynamic adjustment of the number of credits granted to different engines allows the switching of request streaming from one engine to another, seamless. In the case of multiple engines streaming at the same time, the dynamic credit balancing scheme in GCM 1301 allows the credit allocation to settle optimally between the active engines, in accordance with some embodiments. For example, depending on the request rate from active engines, credits are balanced between them. For instance, say two engines A and B are active and the request rate for A is n, and request rate for B is 2n, then the number of credits will settle to have 33% of the credits for engine A and 66% of the credits for engine B.

In some embodiments, by keeping a minimum reserved number of credits for any given engine (managed by GCM 1301), any engine is allowed to not be completely blocked by the activity of another independent engine. As such, a system requirement of having multiple engines running multiple independent workloads, each capable of encountering page faults, can be met.

Figure 14A:
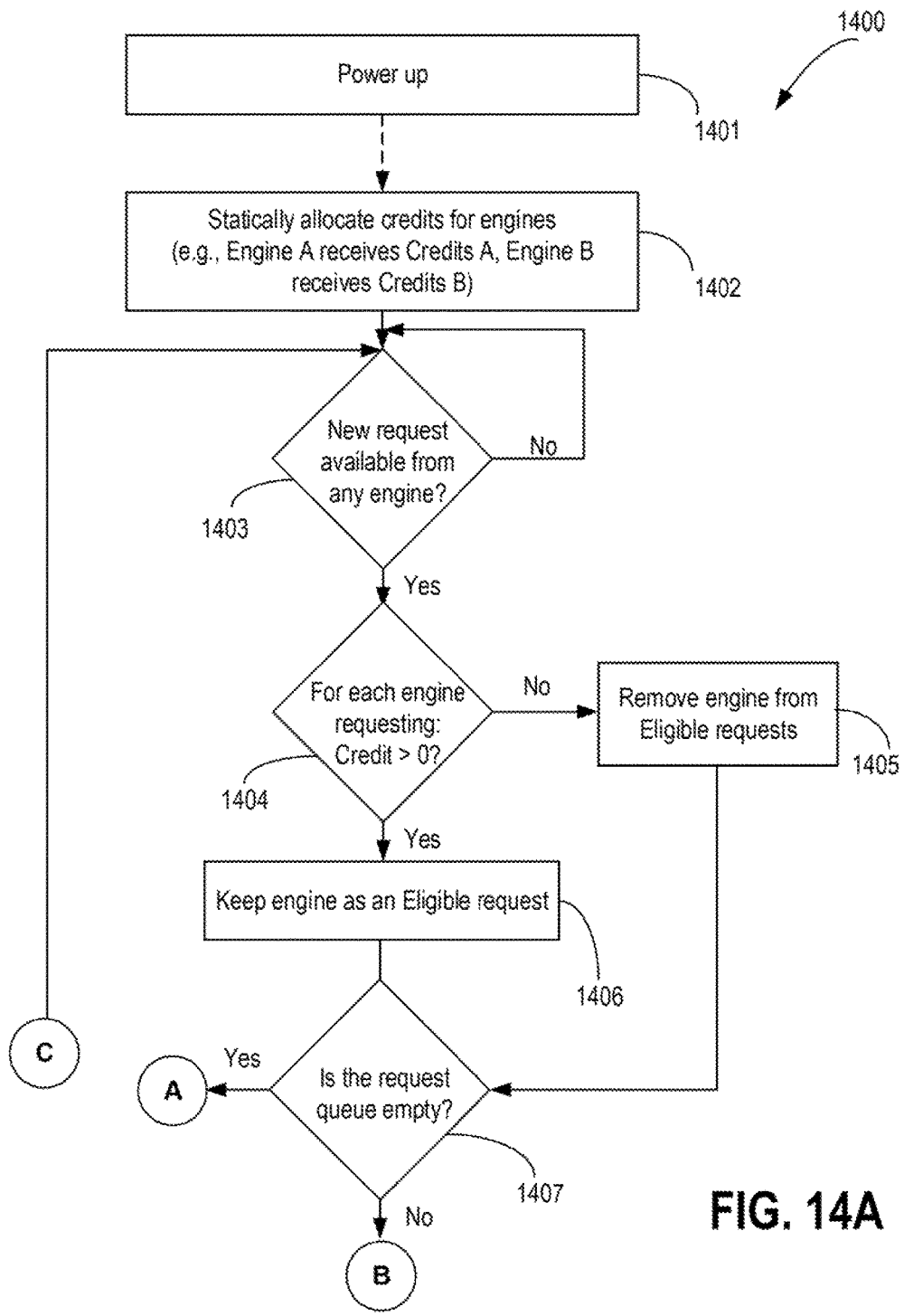
FIGS. 14A-B illustrate a flowchart of a method for shared resource partitioning through static credit management, according to some embodiments of the disclosure.
Figure 14B:
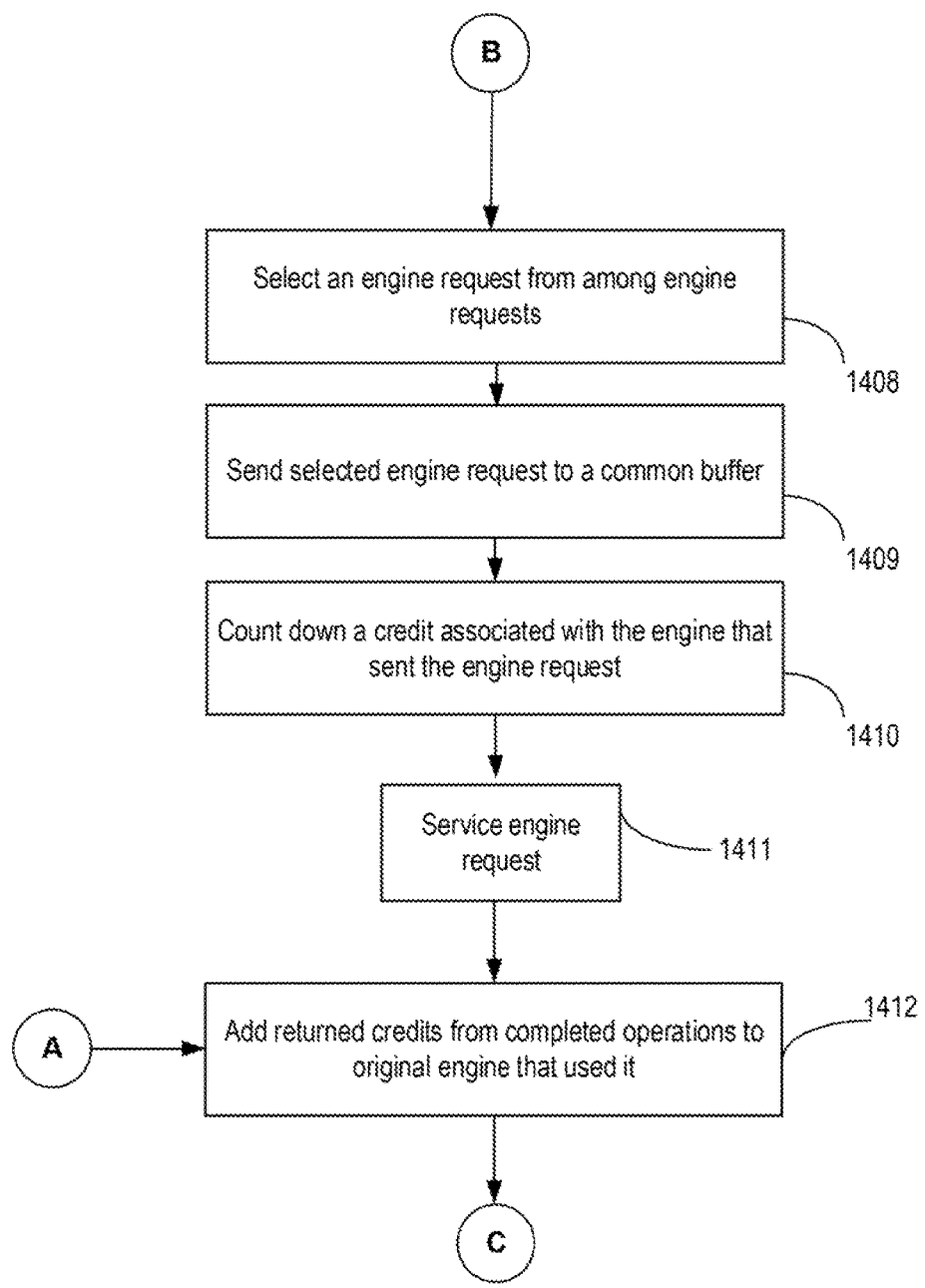

FIGS. 14A-B illustrate flowchart 1400 of a method for shared resource partitioning through static credit management, according to some embodiments of the disclosure. FIG. 14A is connected to FIG. 14B via markers 'A', 'B', and 'C'.

At block 1401, the computer system (including the GPU) is powered up. Many sequence of events begin after power-up (e.g., some sequential are reset, some finite state machines begin to operate, etc.). Among such events, at block 1402, credits are statically allocated for the engines. For example, fixed number of credits are assigned to TLB Engine A 1101$_1$, TLB Engine B 1101$_2$, TLB Engine N 1101$_N$, and other engines. In some embodiments, the credits for each engine are read from memory or a string of registers. In some embodiments, these credits are programmable in the memory or the string of registers by hardware (e.g., fuse) or software (e.g., via operating system). Different engines may be allocated different number of fixed credits. For example, an engine which is expected to service more requests than another engine may receive more fixed number of credits.

At block 1403, a determination is made about any new requests available for any engine. For example, a logic checks internal pipelines of each TLB Engine (e.g., 1101$_1$-1101$_N$) to determine if any of the internal pipelines (e.g., First-in-First-Out (FIFO) pipeline) received a new engine request. If no engine request is received by any of the engines, the process waits (e.g., loops back to block 1403) and checks the internal pipelines again. If any of the engines receive a request (e.g., one of the internal pipelines in the engine receives a request), then the process proceeds to block 1404.

At block 1404, a determination is made about the current number of credits associated with each requesting engine. For example, for any engine to process a request, it must have credits to do so. As such, at block 1404 a determination is made whether the requesting engine has more than zero credits. If so, the process proceed to block 1406 and the engine request is marked as an eligible request. If the requesting engine has no credits, then the process proceeds to block 1405. At block 1405, the requesting engine's request is marked as not eligible for processing, and that engine request is not granted a slot in CPB 1104 unless CPB 1104 is empty as indicated by block 1407.

Referring back to block 1406, after the engine request is marked eligible request (e.g., because the engine has non-zero credits), the process proceeds to block 1407 and a determination is made whether the request queue (e.g., internal pipeline of the requesting engine and/or CPB 1104) is empty. If the request queue is empty, the process proceeds to block 1412 as marked by identifier 'A'. In some embodiments, when the request queue is empty, the engine request is considered serviced. As such, at block 1412, credits are returned, from completed operations, to the original engine that used it. For example, when the Engine A request associated with TLB Engine A 1101$_1$ is complete, Engine A Credits that were used for servicing that request are returned back to 1201$_1$. The process then proceeds to block 1403 as marked by identifier 'C'.

If the request queue is not empty, the process proceeds from block 1407 to block 1408 as marked by identifier 'B'. At block 1408, the engine requests for various engines are selected for servicing. In some embodiments, the engines may have their own pipelines (e.g., series of registers) that store the engine requests as they arrive to that engine. For example, the engines may have a FIFO (first-in-last-out) pipeline that sequences the engine requests as they arrive and then outputs them to multiplexer 1102 in the order they were received.

At block 1408, an engine request is selected from among the various engine requests and sent out for further processing. For example, an engine request that makes it through an internal pipeline of that engine is then selected by multiplexer 1102. In some embodiments, the control for multiplexer 1102 selects an engine request from each engine one at a time (e.g., in a round robin fashion). However, multiplexer 1102 can use any scheme to select engine requests from the engines for servicing.

At block 1409, the selected engine request is sent to CPB 1104 and Common TLB Miss Processing Logic 1103. In some embodiments, once a slot in CPB 1104 is occupied by an engine request, the credit associated with that engine request is deemed used. In some embodiments, after the engine requests makes it to Memory Request Logic 1106 and the engine request is serviced by Memory Controller 1107, then the credit associated with that engine request is deemed used. Various architectures may use different events to identify when a credit is considered used.

At block 1410, depending on the architecture that determines when a credit is deemed used, a counter counts down by one credit from the total number of credits associated for that engine. For example, when Engine A request occupies a slot in CPB 1104, a counter counts down the credit from Engine A Credits $1201_1$. The counter can be placed in any suitable logic. For example, the counter can be part of Engine A Credits logic $1201_1$. As such, each credit logic may have its associated counter to track the number of credits when allocated and as used. At block 1411, the engine request is serviced. In some embodiments, block 1411 is performed before block 1410. After the engine request is serviced and/or after the credit count is updated at block 1410, the process proceeds to block 1412.

At block 1412, credits are returned from completed operations to the original engine that used it. For example, when the Engine A request associated with TLB Engine A $1101_1$ is complete, Engine A Credits that were used for servicing that request are returned back to $1201_1$. The process then proceeds to block 1403 as marked by identifier 'C'.

The flowchart of FIGS. 14A-B can be performed by a finite state machine or any suitable logic. In some embodiments, part of or all of flowchart 1400 is performed by a software module executed by the GPU. In some embodiments, part of flowchart 1400 is performed by software and part of flowchart 1400 is performed by hardware. For example, block 1402 may be performed or controlled by software while blocks 1403-1412 are performed by various hardware as described with reference to FIGS. 11-12.

Figure 15A:
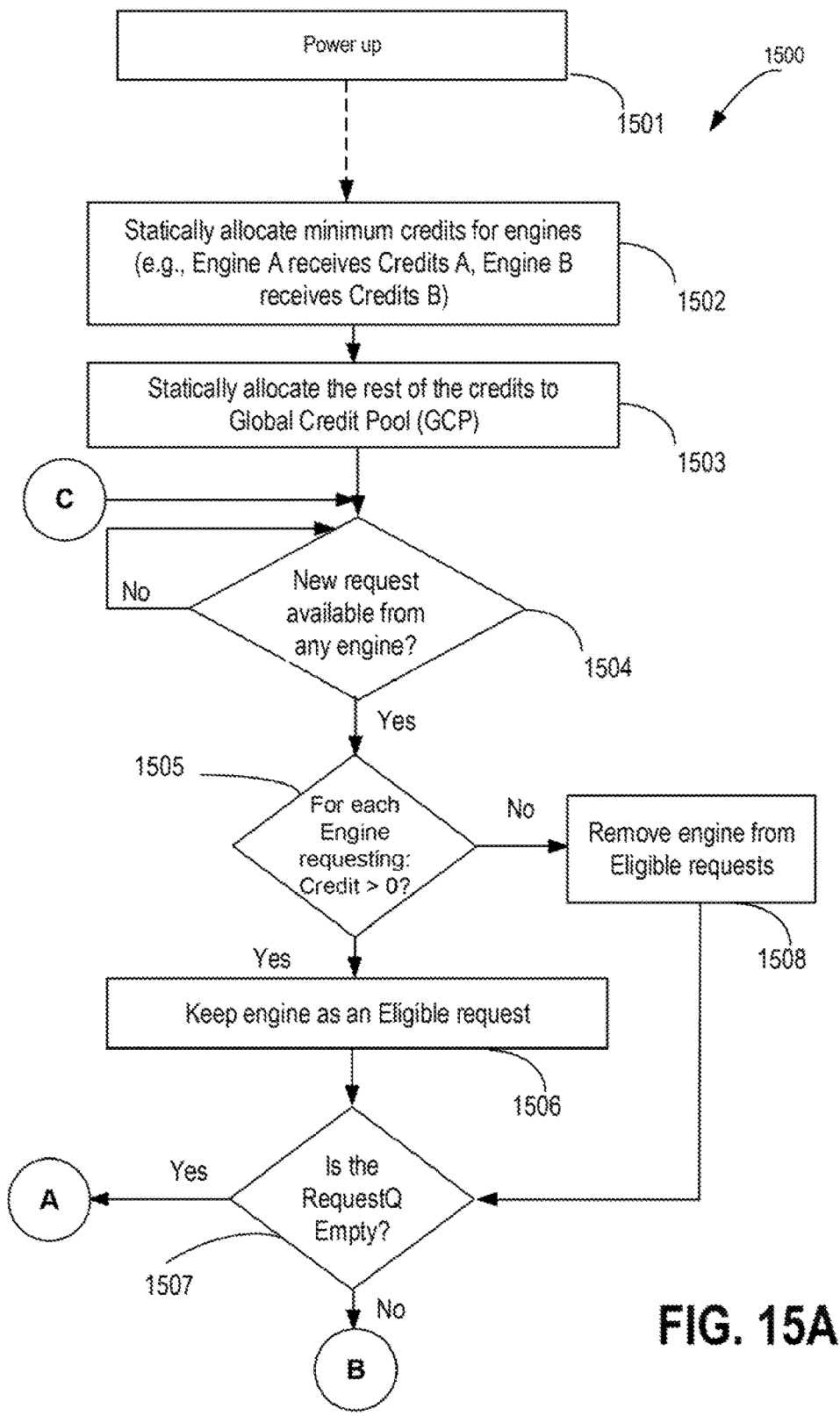
FIGS. 15A-B illustrate a flowchart of a method for shared resource partitioning through dynamic credit management, according to some embodiments of the disclosure.
Figure 15B:
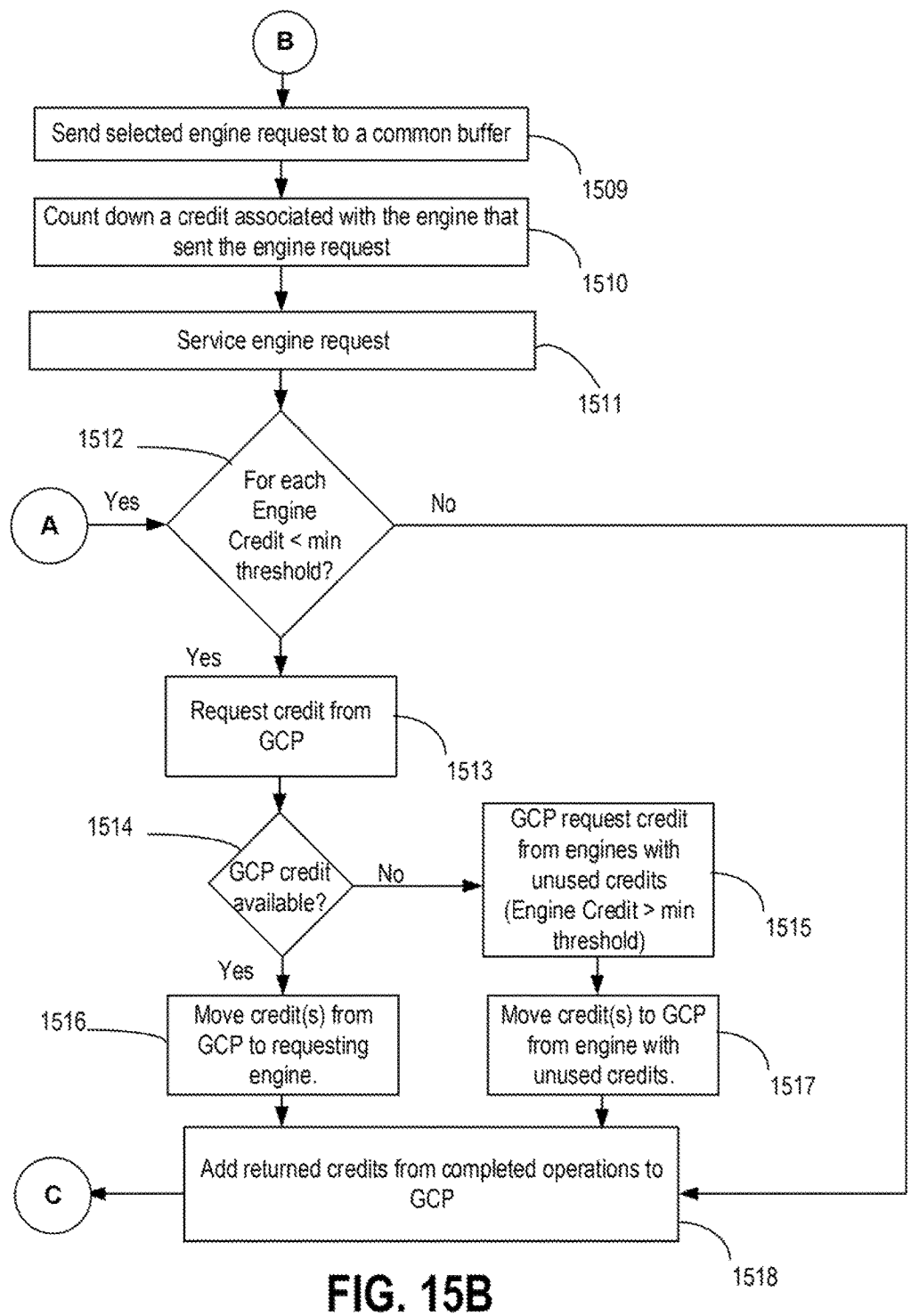

FIGS. 15A-B illustrate flowchart 1500 of a method for shared resource partitioning through dynamic credit management, according to some embodiments of the disclosure.

At block 1501, the computer system (including the GPU) powers up. Many sequence of events begin after power-up (e.g., some sequential are reset, some finite state machines begin to operate, etc.). Among such events, at block 1502, a minimum number of credits are statically allocated to the engines. For example, Engine A receives Credits A, Engine B receives Credits B, etc. Another such event is described with reference to block 1503. At block 1503, credits for GCP 1302 are defined or allocated. In some embodiments, GCP 1302 is a repository of credits being exchanged between various engines. For example, unused credits may be transferred from the engines back to GCP 1302. Likewise, when an engine needs credits, it may look into GCP 1302 to get those credits on demand.

In some embodiments, GCM 1301 manages the credit allocation and deduction for the various engines. Different engines may be allocated different number of fixed credits. For example, an engine which is expected to service more requests than another engine may receive more fixed number of credits.

At block 1504, a determination is made about any new requests available for any engine. For example, a logic checks internal pipelines of each TLB Engine (e.g., $1101_1$-$1101_N$) to determine if any of the internal pipelines (e.g., First-in-First-Out (FIFO) pipeline) received a new engine request. If no engine request is received by any of the engines, the process waits (e.g., loops back to block 1504) and checks the internal pipelines again. If any of the engines receive a request (e.g., one of the internal pipelines in the engine receives a request), then the process proceeds to block 1505.

At block 1505, a determination is made about the current number of credits associated with each requesting engine. For example, for any engine to process a request, it must have credits to do so. As such, at block 1505 a determination is made whether the requesting engine has more than zero credits. If so, the process proceed to block 1506 and the engine request is marked as an eligible request. If the requesting engine has no credits, then the process proceeds to block 1508. At block 1508, the requesting engine's request is marked as not eligible for processing, and that engine request is not granted a slot in CPB 1104 unless CPB 1104 is empty as indicated by block 1507.

Referring back to block 1506, after the engine request is marked eligible request (e.g., because the engine has non-zero credits), the process proceeds to block 1507 and a determination is made whether the request queue (e.g., internal pipeline of the requesting engine and/or CPB 1104) is empty. If the request queue is empty, the process proceeds to block 1512 as marked by identifier 'A'.

At block 1512, a determination is made about the current number of credits for the engines, and whether the current number of credits for an engine is less than a minimum threshold. If the current number of credits falls below the minimum number of thresholds, the process proceeds to block 1513. At block 1513, GCM 1301 requests credits for that engine from GCP 1302. The process then proceeds to block 1514. If the current number of credits for the engine is greater than the minimum threshold, then the process proceeds to block 1518.

At block 1518, credits are returned from completed operations to GCP 1302. For example, when the Engine A request associated with TLB Engine A $1101_1$ is complete, Engine A Credits that were used for servicing that request are returned to GCP 1302. The process then proceeds to block 1504 as marked by identifier 'C'.

Referring back to block 1507, when it is determined that the request queue is not empty, then the process proceeds to block 1509 as indicated by marker 'B'. At block 1509, the engine requests for various engines are selected for servicing. In some embodiments, the engines may have their own pipelines (e.g., series of registers) that store the engine requests as they arrive to that engine. For example, the engines may have a FIFO (first-in-last-out) pipeline that sequences the engine requests as they arrive and then outputs them to multiplexer 1102 in the order they were received.

At block 1509, an engine request is selected from among the various engine requests and sent out for further processing. For example, an engine request that makes it through an internal pipeline of that engine is then selected by multiplexer 1102. In some embodiments, the control for multiplexer 1102 selects an engine request from each engine one at a time (e.g., in a round robin fashion). However, multiplexer 1102 can use any scheme to select engine requests from the engines for servicing.

At block 1509, the selected engine request is sent to CPB 1104 and Common TLB Miss Processing Logic 1103. In some embodiments, once a slot in CPB 1104 is occupied by an engine request, the credit associated with that engine request is deemed used. In some embodiments, after the engine requests makes it to Memory Request Logic 1106 and the engine request is serviced by Memory Controller 1107, then the credit associated with that engine request is deemed used. Various architectures may use different events to identify when a credit is considered used.

At block 1510, depending on the architecture that determines when a credit is deemed used, a counter counts down by one credit from the total number of credits associated for that engine. For example, when Engine A request occupies a slot in CPB 1104, a counter counts down the credit from Engine A Credits 1201$_1$. The counter can be placed in any suitable logic. For example, the counter can be part of Engine A Credits logic 1201$_1$ or part of GCM 1301. In one example, each credit logic may have its associated counter to track the number of credits when allocated and as used. At block 1511, the engine request is serviced. In some embodiments, block 1511 is performed before block 1510. After the engine request is serviced and/or after the credit count is updated at block 1510, the process proceeds to block 1512.

At block 1512, a determination is made about the current number of credits for the engines, and whether the current number of credits for an engine is less than a minimum threshold. If the current number of credits falls below the minimum number of thresholds, the process proceeds to block 1513. At block 1513, GCM 1301 requests credits for that engine from GCP 1302. The process then proceeds to block 1514. If the current number of credits for the engine is greater than the minimum threshold, then the process proceeds to block 1518.

After requesting credits from GCP 1302, the process proceeds to block 1514. At block 1514, GCM 1301 makes a determination whether credits are available in GCP 1302. If credits are available in GCP 1302, the process proceeds to block 1516. At block 1516, one or more credits are transferred or moved from GCP 1302 to the requesting engine. The process then proceeds to block 1518. If GCP 1302 is empty, then GCP 1302 requests unused credits from the various engines. At block 1515, GCP 1302 requests unused credits up to a minimum number of credits for an engine. As such, each engine has a minimum number of credits. At block 1517, GCM 1301 moves the unused credits from various engines to GCP 1302. The process then proceeds to block 1518.

In some embodiments, GCM 1301 dynamically allocates credits from GCP 1302 to active engines. Here, active engines refer to those engines that have pending requests to service. Inactive engines are those engines that have no pending requests and therefore may not need credits to service any request. Here, the term "dynamically" is used in contrast to the term "statically" in that dynamic allocation of credit may refer to credit allocation to engines on demand, credit allocation to engines based on predicted servicing of requests by the engine, credit allocation to engines based on past number of serviced or received engine requests, etc.

Although the blocks with reference to FIGS. 14-15 are shown in a particular order, the order of the actions can be modified. Thus, the illustrated embodiments can be performed in a different order, and some actions/blocks may be performed in parallel. Some of the blocks listed in FIGS. 14-15 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Figure 16:
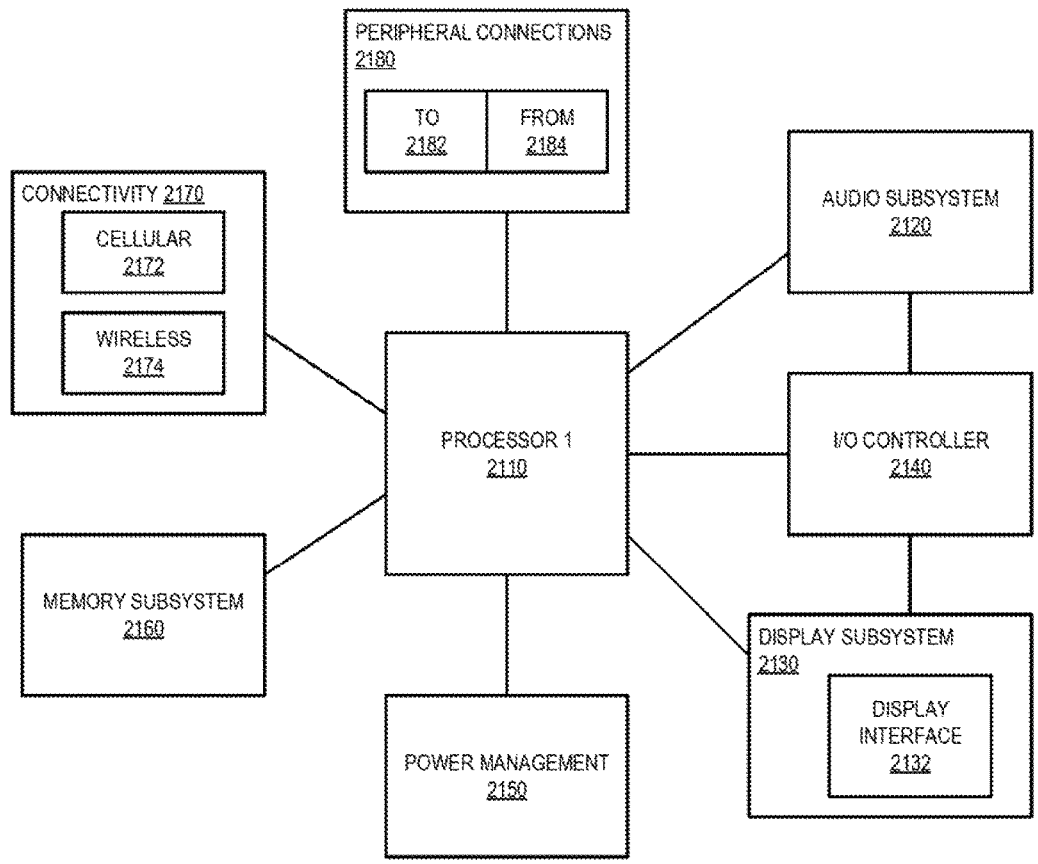
FIG. 16 illustrates a smart device or a computer system or a SoC (System-on-Chip) having an apparatus for shared resource partitioning through credit management, in accordance with some embodiments.

FIG. 16 illustrates a smart device or a computer system or a SoC (System-on-Chip) having an apparatus for shared resource partitioning through credit management, in accordance with some embodiments. It is pointed out that those elements of FIG. 16 having the same reference numbers (or names) as the elements of any other figure can operate or function in any manner similar to that described, but are not limited to such.

FIG. 16 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 2110 having an apparatus for data retention and supply noise mitigation, according to some embodiments discussed. Other blocks of the computing device 1600 may also include an apparatus for data retention and supply noise mitigation of some embodiments. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 2110.

Display subsystem 2130 represents hardware (e.g., display devices) and software (e.g., drivers) components that provide a visual and/or tactile display for a user to interact with the computing device 1600. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 1600. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 1600 to provide I/O functions managed by I/O controller 2140.

In one embodiment, I/O controller 2140 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 2150 that manages battery power usage, charging of the battery, and features related to power saving operation. Memory subsystem 2160 includes memory devices for storing information in computing device 1600. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 1600.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 2170 can include multiple different types of connectivity. To generalize, the computing device 1600 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 1600 could both be a peripheral device ("to" 2182) to other computing devices, as well as have peripheral devices ("from" 2184) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a first engine buffer to receive a first engine request; a first engine register coupled to the first engine buffer, wherein the first engine register is to store one or more first engine credits associated with the first engine buffer; a second engine buffer to receive a second engine request; a second engine register coupled to the second engine buffer, wherein the second engine register is to store one or more second engine credits associated with the second engine buffer; and a common buffer which is common to the first and second engines, wherein the one or more first engine credits represents one or more slots in the common buffer for servicing the first engine request for access to a common resource, and wherein the one or more second engine credits represents one or more slots in the common buffer for servicing the second engine request for access to the common resource.

In some embodiments, the first and second engines are first and second Translation Look Aside Buffers (TLBs), respectively, and wherein the common resource is memory. In some embodiments, apparatus comprises first logic to subtract one or more credits from the one or more first engine credits when the first engine buffer provides the first engine request to the common buffer. In some embodiments, the apparatus comprises logic to subtract one or more credits from the one or more second engine credits when the second engine buffer provides the second engine request to the common buffer. In some embodiments, the apparatus comprises a second logic to: release credits back to the first engine register after the first engine request is serviced by the common buffer; and release credits back to the second engine register after the second engine request is serviced by the common buffer.

In some embodiments, the common buffer is to hold clock cycles of pending requests from the first and second engine buffers. In some embodiments, a total number of credits is equal to a bit size of the common buffer. In some embodiments, the one or more first and/or second engine credits are a fixed number of credits that are predetermined. In some embodiments, the one or more first and/or second engine credits are a fixed number of credits that are programmable by an operating system (OS). In some embodiments, apparatus comprises a logic for dynamically adjusting a number of the one or more first and/or second engine credits according to a demand for the common buffer by the first and second engines. In some embodiments, the first and second engine registers have a minimum number of credits at all times when the apparatus is powered up. In some embodiments, the apparatus comprises a memory for storing credits, wherein the memory is to store unused credits from first and second engines. In some embodiments, the apparatus comprises logic to move credits from the memory to the first and/or second engines upon request from the first and/or second engines.

In another example, a system is provided which comprises: a memory; a graphics processor coupled to the memory, the graphics processor including an apparatus according to the apparatus described above; and a wireless interface for allowing the processor to communicate with another device.

In another example, a method is provided which comprises: allocating first engine credits for a first engine buffer for servicing a first engine request; allocating second engine credits for a second engine buffer for servicing a second engine request; providing a buffered version of the first engine request to a common buffer, wherein the common buffer is common to the first and second engines, wherein the first engine credits represents one or more slots in the common buffer for servicing the first engine request for access to a common resource, and wherein the second engine credits represents one or more slots in the common buffer for servicing the second engine request for access to the common resource; servicing the first engine request; and counting down a number of first engine credits as the first engine request is serviced.

In some embodiments, the method comprises restoring original number of first engine credits after servicing of the first engine request is complete. In some embodiments, allocating the first and second engine credits comprises allocating a fixed number of first and second engine credits at power up such that a total number of credits is equal to a bit size of the common buffer. In some embodiments, allocating the first and second engine credits comprises allocating a dynamic number of first and second engine credits according to a demand for the common buffer by the first and second engines. In some embodiments, the method comprises: maintaining a first minimum number of credits for the first engine buffer for servicing a future first engine request; and maintaining a second minimum number of credits for the second engine buffer for servicing a future second engine request.

In another example, a machine readable storage medium is provided having instructions stored thereon, that when executed, causes a graphic processor to perform an operation according the method described above.

In another example, an apparatus is provided which comprises: means for allocating first engine credits for a first engine buffer for servicing a first engine request; means for allocating second engine credits for a second engine buffer for servicing a second engine request; means for providing a buffered version of the first engine request to a common buffer, wherein the common buffer is common to the first and second engines, wherein the first engine credits represents one or more slots in the common buffer for servicing the first engine request for access to a common resource, and wherein the second engine credits represents one or more slots in the common buffer for servicing the second engine request for access to the common resource; means for servicing the first engine request; and means for counting down a number of first engine credits as the first engine request is serviced.

In some embodiments, the apparatus comprises means for restoring original number of first engine credits after servicing of the first engine request is complete. In some embodiments, the means for allocating the first and second engine credits comprises means for allocating a fixed number of first and second engine credits at power up such that a total number of credits is equal to a bit size of the common buffer. In some embodiments, the means for allocating the first and second engine credits comprises means for allocating a dynamic number of first and second engine credits according to a demand for the common buffer by the first and second engines. In some embodiments, the apparatus comprises: means for maintaining a first minimum number of credits for the first engine buffer for servicing a future first engine request; and means for maintaining a second minimum number of credits for the second engine buffer for servicing a future second engine request.

In another example, a system is provided which comprises: a memory; a graphics processor coupled to the memory, the graphics processor including an apparatus according to the apparatus described above; and a wireless interface for allowing the processor to communicate with another device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus in a graphics processor for shared resource partitioning through credit management, the apparatus comprising:
  a first engine buffer to receive a first engine request;
  a first engine register coupled to the first engine buffer, wherein the first engine register is to store one or more first engine credits associated with the first engine buffer;
  a second engine buffer to receive a second engine request;
  a second engine register coupled to the second engine buffer, wherein the second engine register is to store one or more second engine credits associated with the second engine buffer; and
  a common buffer which is common to the first and second engine buffers, wherein the one or more first engine credits represents one or more slots in the common buffer for servicing the first engine request for access to a common resource, and wherein the one or more second engine credits represents one or more slots in the common buffer for servicing the second engine request for access to the common resource,
  wherein the first and second engine buffers are first and second Translation Look Aside Buffers (TLBs), respectively.

2. The apparatus of claim 1, wherein the common resource is memory.

3. The apparatus of claim 1 comprises first logic to subtract one or more credits from the one or more first engine credits when the first engine buffer provides the first engine request to the common buffer.

4. The apparatus of claim 3 comprises logic to subtract one or more credits from the one or more second engine credits when the second engine buffer provides the second engine request to the common buffer.

5. The apparatus of claim 4 comprises a second logic to:
  release credits back to the first engine register after the first engine request is serviced by the common buffer; and
  release credits back to the second engine register after the second engine request is serviced by the common buffer.

6. The apparatus of claim 1, wherein the common buffer is to hold clock cycles of pending requests from the first and second engine buffers.

7. The apparatus of claim 1, wherein a total number of credits is equal to a bit size of the common buffer.

8. The apparatus of claim 1, wherein the one or more first and/or second engine credits are a fixed number of credits that are predetermined.

9. The apparatus of claim 8, wherein the first and second engine registers have a minimum number of credits at all times when the apparatus is powered up.

10. The apparatus of claim 1, wherein the one or more first and/or second engine credits are a fixed number of credits that are programmable by an operating system (OS).

11. The apparatus of claim 1 comprises a logic for dynamically adjusting a number of the one or more first and/or second engine credits according to a demand for the common buffer by the first and second engines.

12. The apparatus of claim 1 comprises a memory for storing credits, wherein the memory is to store unused credits from first and second engines.

13. The apparatus of claim 12 comprises logic to move credits from the memory to the first and/or second engines upon request from the first and/or second engines.

14. A method for shared resource partitioning through credit management, the method performed by a graphics processor, the method comprising:
  allocating first engine credits for a first engine buffer for servicing a first engine request;
  allocating second engine credits for a second engine buffer for servicing a second engine request;
  providing a buffered version of the first engine request to a common buffer, wherein the common buffer is common to the first and second engine buffers, wherein the first engine credits represents one or more slots in the common buffer for servicing the first engine request for access to a common resource, and wherein the second engine credits represents one or more slots in the common buffer for servicing the second engine request for access to the common resource;
  servicing the first engine request; and
  counting down a number of first engine credits as the first engine request is serviced.

15. The method of claim 14 comprising restoring original number of first engine credits after servicing of the first engine request is complete.

16. The method of claim 14, wherein allocating the first and second engine credits comprises allocating a fixed number of first and second engine credits at power up such that a total number of credits is equal to a bit size of the common buffer.

17. The method of claim 14, wherein allocating the first and second engine credits comprises allocating a dynamic number of first and second engine credits according to a demand for the common buffer by the first and second engines.

18. The method of claim 17 comprising:
  maintaining a first minimum number of credits for the first engine buffer for servicing a future first engine request; and
  maintaining a second minimum number of credits for the second engine buffer for servicing a future second engine request.

19. A system comprising:
  a memory;

a graphics processor coupled to the memory, wherein the graphics processor is to provide shared resource partitioning through credit management, wherein the graphics processor including:
  a first engine buffer to receive a first engine request;
  a first engine register coupled to the first engine buffer, wherein the first engine register is to store first engine credits associated with the first engine buffer;
  a second engine buffer to receive a second engine request;
  a second engine register coupled to the second engine buffer, wherein the second engine register is to store second engine credits associated with the second engine buffer; and
  a common buffer which is common to the first and second engine buffers, wherein the first engine credits represents one or more slots in the common buffer for servicing the first engine request for access to a common resource, and wherein the second engine credits represents one or more slots in the common buffer for servicing the second engine request for access to the common resource; and
a wireless interface for allowing the processor to communicate with another device.

20. The system of claim 19, wherein the first and second engine buffers are first and second Translation Look Aside Buffers (TLBs), respectively, and wherein the common resource the memory.

\* \* \* \* \*